US012715773B2

(12) United States Patent
Prada Silvy et al.

(10) Patent No.: US 12,715,773 B2
(45) Date of Patent: Aug. 25, 2026

(54) CARBON NANOTUBE HYBRID MATERIALS AND METHODS OF PRODUCING THE HYBRID MATERIALS

(71) Applicant: Chasm Advanced Materials, Inc., Canton, MA (US)

(72) Inventors: Ricardo A. Prada Silvy, Norman, OK (US); David J. Arthur, Norwood, MA (US)

(73) Assignee: Chasm Advanced Materials, Inc., Canton, MA (US)

( * ) Notice: Subject to any disclaimer, the term of this patent is extended or adjusted under 35 U.S.C. 154(b) by 0 days.

(21) Appl. No.: 17/667,373

(22) Filed: Feb. 8, 2022

(65) Prior Publication Data

US 2022/0250912 A1 Aug. 11, 2022

Related U.S. Application Data

(60) Provisional application No. 63/146,980, filed on Feb. 8, 2021.

(51) Int. Cl.

*C01B 32/162* (2017.01)
*B01J 21/08* (2006.01)
*B01J 23/882* (2006.01)
*C01B 32/159* (2017.01)

(52) U.S. Cl.

CPC ............. *C01B 32/162* (2017.08); *B01J 21/08* (2013.01); *B01J 23/882* (2013.01); *C01B 32/159* (2017.08); *B01J 2235/30* (2024.01); *C01P 2004/133* (2013.01); *C01P 2004/61* (2013.01);

(Continued)

(58) Field of Classification Search

CPC ..... C01B 32/162; C01B 32/159; C01B 32/17; C01B 32/186; C01B 32/20; C01B 2202/02; C01B 2202/06; B01J 21/08; B01J 23/882; B01J 35/002; C09C 1/48; C01P 2004/133;

(Continued)

(56) References Cited

U.S. PATENT DOCUMENTS 7,198,772 B2 * 4/2007 Moy .................... B01J 37/0217 423/447.3
2008/0233402 A1 * 9/2008 Carlson ..................... C09C 1/48 428/323

(Continued)

FOREIGN PATENT DOCUMENTS

WO WO-2010076885 A1 * 7/2010 ............ B01J 23/745

OTHER PUBLICATIONS

Silva et al. CrystEngComm 2012, 14, 48 (Year: 2012).*

(Continued)

*Primary Examiner* — Sally A Merkling
*Assistant Examiner* — Jordan W Taylor
(74) *Attorney, Agent, or Firm* — Brian M. Dingman; Prince Lobel Tye, LLP

(57) ABSTRACT

Carbon nanotube (CNT) hybrid materials and methods of making such materials. A carbon nanotube (CNT) hybrid powder material includes a mesh of CNTs intimately interspersed with particles of a second material. In an example the material includes a blend that itself includes particles of a metal oxide supported catalyst and particles of a second material, and a mesh of CNTs is grown on the supported catalyst in the blend. The mesh of CNTs is effective to disperse the particles of the second material.

15 Claims, 22 Drawing Sheets

(52) U.S. Cl.
CPC ....... *C01P 2006/11* (2013.01); *C01P 2006/12* (2013.01); *C01P 2006/14* (2013.01)

(58) Field of Classification Search
CPC .............. C01P 2004/61; C01P 2006/11; C01P 2006/12; C01P 2006/14
See application file for complete search history.

(56) References Cited

U.S. PATENT DOCUMENTS

| | | | | |
|---|---|---|---|---|
| 2009/0220767 | A1* | 9/2009 | Schlogl | B01J 23/745<br>428/323 |
| 2009/0286675 | A1* | 11/2009 | Wei | C01B 32/162<br>502/185 |
| 2013/0039839 | A1* | 2/2013 | Hocke | B82Y 30/00<br>423/447.2 |
| 2019/0152782 | A1* | 5/2019 | Noyes | C23C 16/26 |
| 2020/0207625 | A1* | 7/2020 | Tour | C01B 32/162 |

OTHER PUBLICATIONS

Wen et al. Environ. Sci. Technol. 2014, 48, 4048-4055 (Year: 2014).*
Xie et al. Carbon 2013, 52, 535-540 (Year: 2013).*
Dasgupta et al. Materials Letters, 2007, 61, 4496-4499 (Year: 2007).*
Zheng et al. Electrochimica Acta 233 (2017) 229-236 (Year: 2017).*
Aboul-Enein et al. Chemical Engineering Journal 2018, 354, 802-816 (Year: 2018).*
Ali et al. Ceramics International 2020, 46, 19158-19169 (Year: 2020).*
Hata et al. WO2010076885A1 English Machine Translation (Year: 2010).*
Pietsch, Powder and Bulk Solids, Feb. 26, 2008 (Year: 2008).*
Rollas-Challa et al. Diamond and Related Materials 2015, 60, 34-41 (Year: 2015).*
Flexicon, Carbon Black, Materials Handled, 2013 (Year: 2013).*
Wang et al. J. Power Sources 2013, 233, 209-215 (Year: 2013).*
Jia et al. Nat. Comm. 2020 (Year: 2020).*

* cited by examiner

CARBON NANOTUBE HYBRID MATERIALS AND METHODS OF PRODUCING THE HYBRID MATERIALS

CROSS-REFERENCE TO RELATED APPLICATION

This application claims priority of Provisional Patent Application 63/146,980 filed on Feb. 8, 2021, the entire disclosure of which is incorporated by reference herein for all purposes.

BACKGROUND

This disclosure relates to a carbon nanotube (CNT) hybrid material and methods of producing the hybrid material.

There are a large number of commercial applications that take advantage of the material properties of carbon nanotubes (CNTs). For instance, carbon nanotubes have been employed to enhance electrical, thermal conductivity and mechanical properties of different carbon and metal oxide materials. Carbon nanotubes blended with conductive carbon (carbon super-p) in Li-ion battery cathode or graphite in the anode enable the highest reversible energy capacity of any other carbon materials for their use in lithium-ion batteries while increasing the number of charge and discharge cycles without experiencing any energy capacity loss (longer durability). They are also outstanding materials for supercapacitor electrodes.

CNTs have also been employed for improving mechanical and thermal stability properties of thermoplastic and elastomer compounds employed for different commercial products, for instance, conductive polymers, plastics, tires, sealing, gaskets, etc. The high aspect ratio of CNTs enables lower loading concentration compared to other fillers, such as carbon black and silica, that are widely used to reinforce mechanical and ultimate properties of rubbers. The extent of property improvement depends on the size of the particles, their structure, and surface activity. The key for the effect of such fillers is to reach a sufficiently high dispersion using specific mixing techniques, like optimized melt mixing or latex mixing technologies, in combination with surface treatment or the pre-preparation of the fillers in suspensions. The high aspect ratio of CNTs enables lower loading of the CNT filler concentration, leading to high effects, so the density and the weight of the elastomeric materials can be reduced in comparison to carbon black (CB)-filler, chopped carbon fiber, silica or stainless-steel fiber materials. The reinforcing effects in improving elasticity, stiffness, toughness, and strength, are generally attributed to strong rubber-filler interactions and their dispersibility.

Large agglomerates of CNT are sometimes mechanically blended with different carbon or metal oxide materials. The CNT agglomerates having mm sizes require grinding before mixing with the carbon material that generally has a very small particle size (a few microns), otherwise a non-homogeneous blend will be obtained. During the grinding process, the CNTs can break, which can negate the performance benefits of the hybrid material vs. the carbon material.

Another method employed for preparing CNT-carbon hybrid materials in the prior art is to support the active metals on the carbon material surface and then grow CNTs to create a "hairy" carbon hybrid. This method may have limitations when the primary particles of the carbon black are comparable in size with the active phase particle sizes.

Extensive research has been focused on the dispersion of CNTs, including ball milling, ultrasonication, and physical and chemical modification. Nevertheless, these methods generally require complicated processing, and might break CNTs into shorter segments.

SUMMARY

In an example this disclosure relates to novel methods for creating CNT hybrid materials. This disclosure also relates to the CNT hybrid materials. The methods create CNT hybrid materials in a safe, scalable, affordable manner as compared to physical mixing of pre-synthesized CNTs with other particulate materials. In some examples the CNT hybrid materials are used to improve the mechanical, thermal and/or conductivity properties of different particulate materials. In some examples the particulate materials include different forms of carbon (such as: graphene, synthetic and natural graphite, carbon black, activated carbon, carbon fibers, etc.). In some examples the particulate materials include one or more metal oxides such as silica and alumina. In some examples the CNT hybrid materials are used in electrode materials in battery applications. This includes active materials used in cathodes (including but not limited to Lithium Cobalt Oxide or Lithium Cobalt, Lithium Manganese Oxide (also known as spinel or Lithium Manganate), Lithium Iron Phosphate, as well as Lithium Nickel Manganese Cobalt (or NMC) and Lithium Nickel Cobalt Aluminum Oxide (or NCA)) and anodes.

In an example the method for dispersing CNTs comprises blending particles of a metal oxide supported catalyst with particles of a second material. The blend does not require any particular degree of mixing or homogeneity. The components of the blend can be homogeneous, or substantially homogeneous. Alternatively, the components of the blend need not be homogeneously distributed in the blend. The particles of the second material are dispersed by the CNT grown on the metal oxide supported catalyst. In some examples the second material is a carbon material in different proportions that can in some examples vary between 5 to 50 weight percent (wt %). In some examples the second material includes one or more metal oxides such as silica and alumina. In an example the blending of the different particles consists of preparing a paste of metal oxide supported catalyst and the second material. In some examples the paste is prepared using an organic solvent, such as an alcohol, in a high-speed mixer. The solvent is evaporated in an oven at atmospheric pressure or under vacuum. In some examples CNT synthesis is carried out in a fluidized bed or rotary tube reactor in the presence of a carbon source ($C_2H_4$, $C_2H_2$, $CH_4$, CO, etc.) in $H_2$ or inert gas, at a total pressure from atmospheric to 100 psig and at temperatures ranging between 400 and 1000° C.

In some examples blending of these two materials can be accomplished by preparing an organic paste containing both metal oxide supported catalyst and carbon materials in a high-speed mixer, evaporating the organic solvent and then carrying out the carbon nanotube synthesis to form the hybrid material in a rotary tube or fluidized bed reactor utilizing different carbon sources (CO, $CH_4$, $C_2H_2$, $C_2H_4$, etc.) and process conditions (T=400-1000° C., P=ambient to 100 psig). By using a supported metal catalyst, it is possible to control the morphology properties of the CNTs (diameter and length) and the size of the CNT agglomerates particles. When combining a metal oxide supported catalyst with a carbon material (or a different second material), the CNTs have the tendency to separate large agglomerate particles, enabling a good dispersion of smaller second material (e.g., carbon) aggregates particles. The particle sizes of the carbon powder are smaller than 100 microns, which represent a limitation for using these materials in conventional fixed bed and moving bed reactors. Fluidized and rotary kiln reactors have demonstrated several advantages when working with fine powder vs. other catalytic reactors; for instance, good heat transfer and contact between gas and solid particles, in particular when both the density and the reactor volume change during the CNT growth. The product can be produced in continuous or semi-continuous operation modes which enables the production of hundreds of metric tons per year of CNT-carbon hybrid material.

In an example the method of this disclosure: i) increases the dispersion of the second (e.g., carbon) material, thus the CNT enables separation of coarse agglomerate carbon particles, ii) creates a more intimate contact between both CNT and the particles of the second material, iii) increases the surface area and pore volume of the hybrid material, and iv) enhances the density properties of the product.

A result is a more intimate mixture of the CNT with the second material. Another result is that the electrical conductivity and mechanical properties of the hybrid materials can be increased beyond those available in the second material itself. Another result is that composite materials can be formulated over a wider range of CNT loading levels as compared to materials in which the CNT is physically mixed in. Also, the surfaces of the particles of the second material are not covered with CNT and are thus available to contribute to the properties of the hybrid material.

This method of CNT-carbon dispersion is much more effective than mechanical mixing CNTs and carbon material. For instance, when multiwalled carbon nanotubes (MWCNT) are synthesized, the particles can grow to a few millimeters in diameter which requires breaking the agglomerate MWCNT into smaller particles before mixing with other carbon material, for instance graphite or carbon black particles having particle sizes of tens of microns. During this process, the CNT tubes can be broken causing a decrease of the CNTs aspect ratio and mitigating the performance of the carbon hybrid material.

Another example contemplates growing a mesh of carbon nanotubes on a metal oxide catalyst support. Colloidal particles, such as silica, alumina, magnesium or titanium, are deposited together with an active metal on the metal oxide substrate surface by impregnation techniques, followed by drying and calcination steps. An active metal refers to transition metals such as; Co, Fe, Ni, Cu, Ru, Pd, Mo, W, etc. that are deposited on a metal oxide, (e.g., silica ($SiO_2$), alumina ($Al_2O_3$), magnesia (MgO), titania ($TiO_2$) or mixtures of them, such as a catalyst support that includes both up to about 5% magnesia and from about 80% to about 98% alumina or carbon (e.g., natural or synthetic graphite or graphene) support surface by impregnation methods. The amount of active metal is tuned in order to avoid the formation of a dense carpet of CNTs on the metal oxide/substrate surface, which happens when depositing the active metals on the substrate surface, and to control the CNT growth. Through this technique, a mesh of long-SWCNT (CNT length typically ≥5 μm) covering the external surface of the silica particles is formed. When the carbon nanotubes grow on the surface of the silica particles in the form of a mesh, the agglomerated silica particles separate from each other and disperse. This creates a greater contact between the surface of these particles and molecules of other present substance(s) such as an elastomer. A smaller amount of filler will then be required to achieve a greater benefit in the mechanical properties of the elastomer. In an example this CNT-silica hybrid material thus reduces or eliminates the need for using carbon black in combination with silica for reinforcing tires, for example.

In some examples for synthesizing the CNT-metal oxide hybrid material, a solution containing the active metals and colloidal particles (preferentially silica or alumina) is deposited on the metal oxide substrate using impregnation techniques. The material is subsequently dried and calcined to form the metal oxide active phase precursors. The colloidal particles modify the surface roughness of the metal oxide substrate. The active metals are preferentially supported on surfaces of the colloidal particles. In contrast with conventional catalyst preparation method, meshes of long and straight CNTs were observed on the surface modified metal oxide substrate after synthesis. This CNT structure is expected to provide better performance in tire reinforcement and conductive coatings as compared to forming a thick CNT surface carpet, where the tubes are shorter and entangled.

In some examples for preparing SWCNT mesh on a silica or graphite support surface, an aqueous solution containing salts of Co and Mo and colloidal silica particles that are used as a surface modifier additive and a non-ionic surfactant (only in the case of using graphite or other hydrophobic catalyst support) is used to impregnate the support surface. The metallic salts deposited on the surface are transformed to a metal oxide active phase precursor after calcining the catalyst. The metal oxide precursor (Co) is transformed into metal nanoparticles during the activation step (i.e., reduction in $H_2$). During the synthesis of SWCNT in the presence of CO at high temperature the reduced Mo oxide is transformed into molybdenum carbide that supports the Co nanoparticles.

In some examples for preparing a CNT-carbon mesh, a metal oxide supported catalyst, for instance combinations of Fe, Co, Ni, Mo or W supported on $Al_2O_3$ or mixed oxides containing $Al_2O_3$—$TiO_2$, $Al_2O_3$—MgO, $Al_2O_3$—ZrO, $Al_2O_3$—$SiO_2$, is blended with a carbon material (graphite, carbon black, activated carbon, etc.). In some examples blending is accomplished using an organic solvent in a mixer equipment to form a paste. The solvent is removed by evaporation at controlled temperature and can be recovered using a vacuum equipment. A CNT-carbon hybrid material is then synthesized using the dried material blend. The desired combinations of the metal oxide supported catalyst-carbon material depends on the specific application (tires, energy storage, other materials for conductivity or reinforcements applications, etc.).

In some examples a carbon nanotube (CNT) hybrid powder material includes a mesh of CNTs intimately interspersed with particles of a second material. In some examples the hybrid material further includes particles of a first material that is different than the second material. In some examples the first material includes metal oxide support particles. In some examples the first material also includes catalyst on at least some of the metal oxide support particles.

In some examples a carbon nanotube (CNT) hybrid material includes a blend comprising particles of a first material and particles of a different second material. A mesh of CNTs is coupled to the particles of the first material. The mesh of CNTs is effective to disperse the particles of the second material. In some examples the first material comprises metal oxide support particles. In some examples the first material also includes catalyst on at least some of the metal oxide support particles.

Some examples include one of the above and/or below features, or any combination thereof. In an example the second material comprises a form of carbon. In an example the second material comprises at least one of carbon black, graphite, and graphene. In an example the second material comprises one or more metal oxides, such as silica and/or alumina. In an example the catalyst support comprises at least one of alumina, silica, and magnesia. In an example the CNT comprises at least one of single-walled CNT (SWCNT), few-walled CNT (FWCNT), and multi-walled CNT (MWCNT). In an example the material comprises from about 5 weight % to about 50 weight % CNT. In an example the material comprises from about 10 weight % to about 50 weight % catalyst.

Some examples include one of the above and/or below features, or any combination thereof. In an example at least some of the CNTs are directly coupled to the particles of the first material and are proximate to but not directly coupled to the particles of the second material. In an example at least some of the CNTs are directly coupled to the particles of the first material and are also directly coupled to the particles of the second material. In an example the material has a BET surface area of at least about 140 $m^2/g$. In an example the material has a pore volume of at least about 0.43 ml/g. In an example the material has a tap bulk density of about 0.102 g/ml or less. In an example the material has a mean particle size of at least about 42 microns.

In other examples a carbon nanotube (CNT) hybrid material includes a substrate comprising both a metal oxide supported catalyst precursor and a colloidal material on a support surface and CNTs on both the support surface and the colloidal material.

Some examples include one of the above and/or below features, or any combination thereof. In an example the support surface comprises silica or a form of carbon. In an example the colloidal material comprises colloidal silica.

In other examples a method for forming a carbon nanotube (CNT) hybrid material includes forming a blend comprising a metal oxide supported catalyst and particles of a second material and synthesizing CNTs on the blend, to create the CNT hybrid material.

Some examples include one of the above and/or below features, or any combination thereof. In an example the second material comprises at least one of carbon black, graphite, graphene, and silica. In some examples at least some of the metal oxide catalyst support is removed from the CNT hybrid material. In an example metal oxide catalyst support is removed by chemical purification of the hybrid material.

In other examples a method for forming a carbon nanotube (CNT) hybrid material includes preparing a substrate comprising both a metal oxide supported catalyst precursor and a colloidal material on a support surface and synthesizing CNTs on both the support surface and the colloidal material, to create the CNT hybrid material.

Some examples include one of the above and/or below features, or any combination thereof. In an example the support surface comprises silica or a form of carbon. In an example the colloidal material comprises colloidal silica.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIGS. 5A-5D are SEM images at different magnifications of catalyst particles, mesh of SWCNTs formed on silica nanoparticles, mesh of SWCNTs on a $SiO_2$ substrate, individual SWCNT bundles, while

DETAILED DESCRIPTION

Figures 1A, 1B:
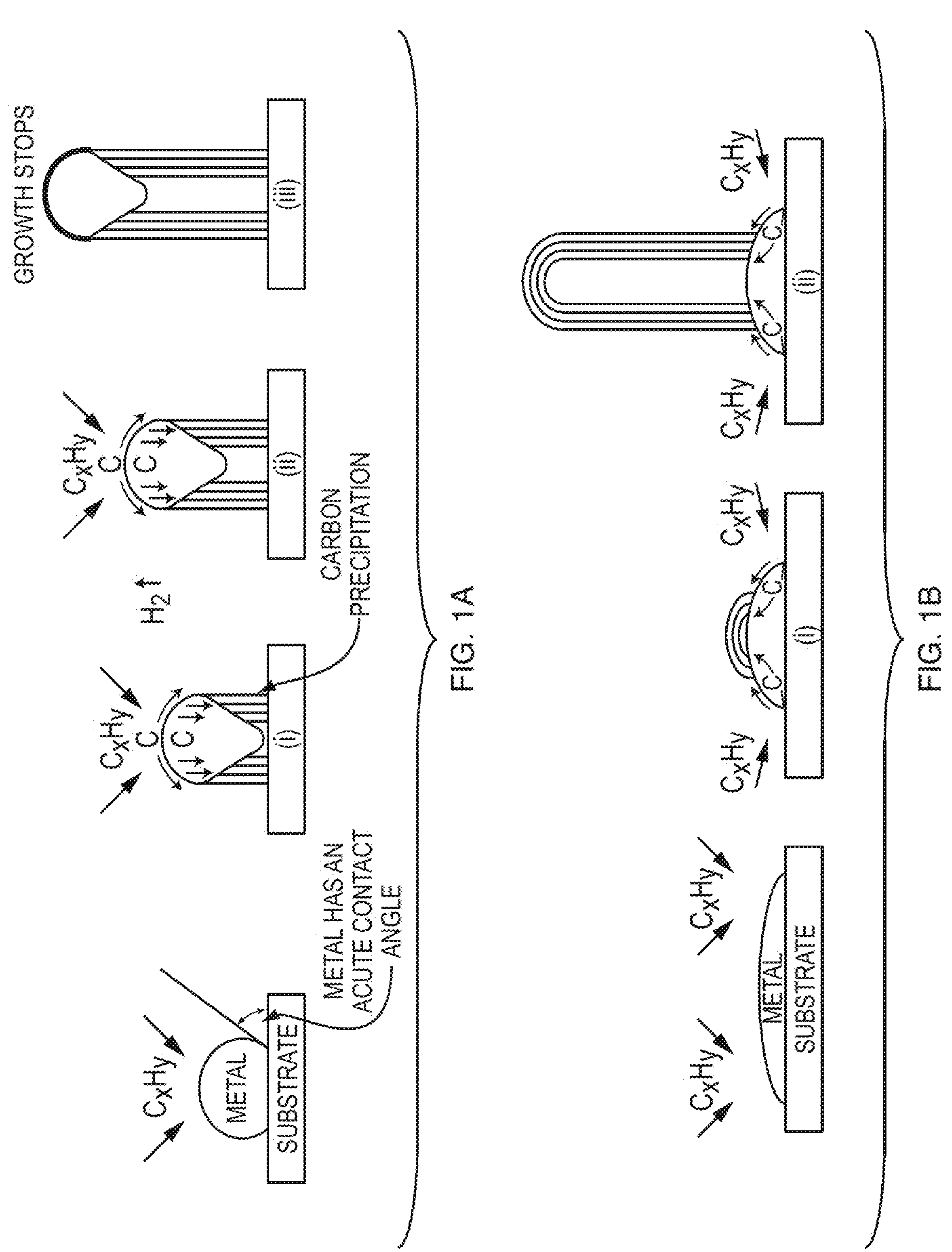
FIG. 1A illustrates four stages of carbon precipitation of a tip-growth CNT growth model where the active metal-substrate interaction is weak and FIG. 1B illustrates three stages of carbon precipitation of a base-growth CNT growth model where the active metal-substrate interaction is strong.

Examples of the materials and methods discussed herein are not limited in application to the details set forth in the following description or illustrated in the accompanying drawings. The materials and methods are capable of implementation in other examples and of being practiced or of being carried out in various ways. Examples of specific implementations are provided herein for illustrative purposes only and are not intended to be limiting. In particular, functions, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, materials, elements, acts, or functions of the materials and methods herein referred to in the singular may also embrace embodiments including a plurality, and any references in plural may also embrace examples including only a singularity. Accordingly, references in the singular or plural form are not intended to limit the presently disclosed materials or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

This disclosure is related in part to novel methods for dispersing carbon nanotube (CNT) materials when they are used as an additive to improve the mechanical, thermal and/or conductivity properties of different carbon and metal oxide materials. The resulting novel hybrid materials can be used in desired applications, including but not limited to electrode materials in battery and super capacitors applications (both cathode and anodes) and elastomer compounds employed for different commercial products (tires, sealants, gaskets, etc.).

One of the main challenges to blend CNT materials with carbon, metal or with metal oxides is the differences in particle size and densities between both materials. Multi-walled carbon nanotubes, as produced or purified, have particles of a few millimeters size and tap bulk densities that can vary between 50 to 80 Kg/m$^3$. Single walled carbon nanotubes have particle sizes between 100 to 500 micron and densities between 40-90 Kg/m$^3$ range. Carbon black and graphite materials have particles of a few microns, generally between 5 to 50 microns for electrode applications and tap bulk densities in the 100 to 400 kg/m$^3$ range. Silica has particles having some tens of microns in size and densities in the 50 to 120 kg/m$^3$ range. Due to the differences in particle sizes and densities between CNTs and carbon and between metal oxide fillers, the CNTs have typically been submitted to grinding and sieving processes before blending with the carbon or metal oxide material. During this process, breakage of the tubes may occur, and the aspect ratio of the CNTs can decrease significantly, thereby inhibiting the expected performance benefits.

A manner to solve this technical issue is to blend a metal oxide supported catalyst with a carbon material or a different second material. The blend is a powder. Synthesis of the CNTs is carried out on the blend in a rotary tube reactor or a fluidized bed reactor in the presence of a carbon source at moderately-high temperatures and pressures between atmospheric and 100 psig. The carbon source can be diluted in an inert gas (such as $N_2$, Ar) or with $H_2$. When the carbon source gas is contacted with the catalyst particles at the synthesis temperature, the metal oxides are transformed into active metals nanoparticles supported on a metal carbide substrate. For single walled carbon nanotubes (SWCNT), the minimum metal agglomerate metal cluster size is about 0.5 nm, while for MWCNT the critical metals cluster size is about 12 nm. Below these sizes, it is not possible to grow CNTs, and other types of carbons are formed.

FIG. 1 represents different CNT growth mechanisms proposed in the literature. The mechanism depends on the interaction between the active metal catalyst and the substrate surface. When the active metal-surface interaction is weak, the surface contact is lower (metal particles show a high contact angle) and the CNT growth takes place following a tip-growth mechanism (FIG. 1A). Large diameter and short CNTs are formed. In contrast, when the interaction between the active metal and the surface is strong, the metal particles contact angle is lower, therefore their surface contact is higher and the CNTs growth takes place following a base-growth mechanism (FIG. 1B). In this case, long CNTs having smaller diameter are obtained.

Figure 2:
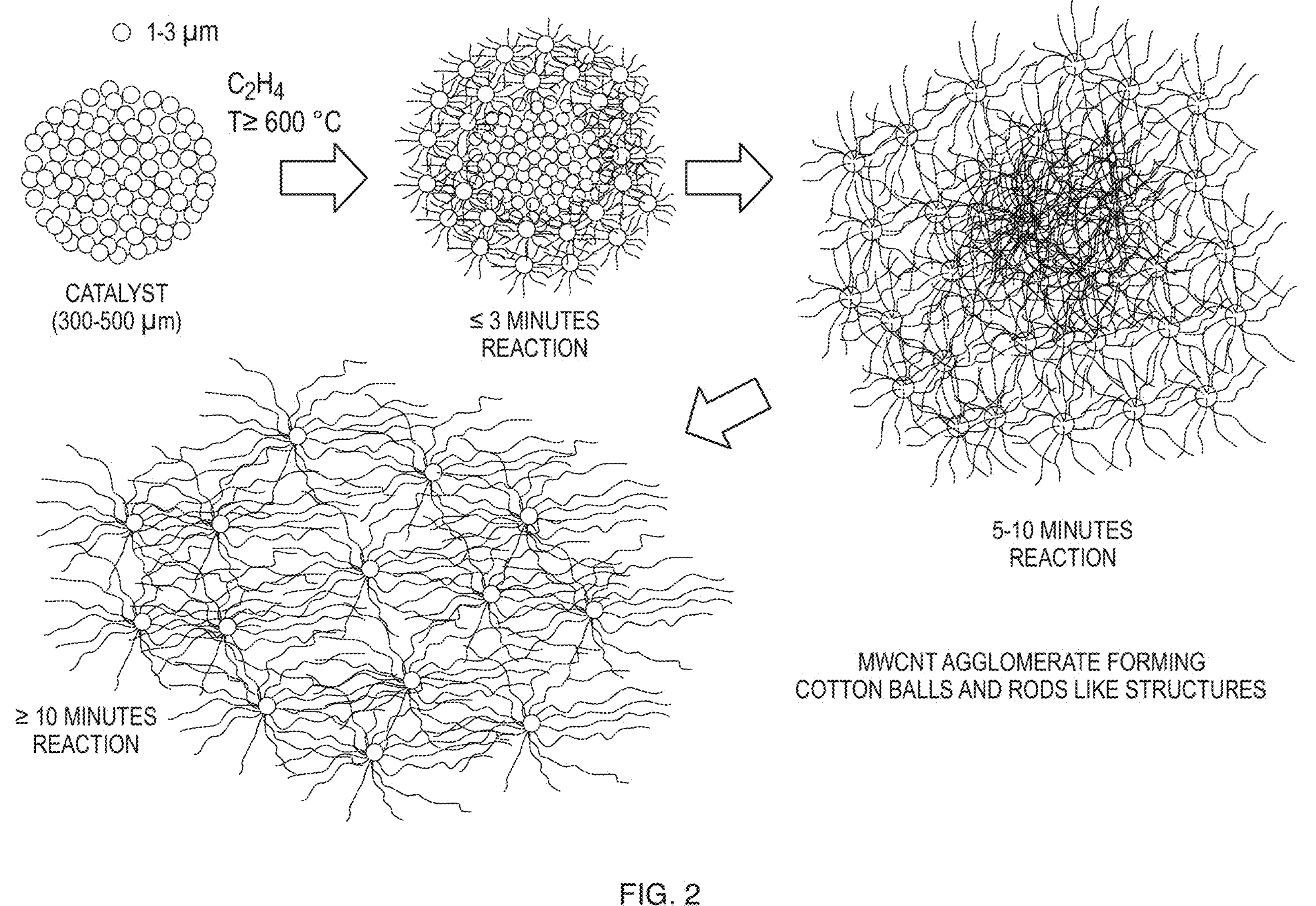
FIG. 2 is a proposed model of MWCNT growth on supported metal oxide catalyst.

FIG. 2 is a representation of a multi-walled carbon nanotube (MWCNT) growth proposed mechanism when using metal supported catalysts at different carbon source-catalyst contact times. The reactant molecules decompose on the catalyst active sites resulting in carbon deposition and the product properties begin changing as a function of the carbon build up. The CNT growth mainly takes place via base-mode mechanism (FIG. 1B). For the first 5 minutes of reaction, the surface primary catalyst particles having few microns sizes start separating from each other due to CNT growth. A series of reactions take place, starting from the surface and progressing to the core of the catalyst grains; the particle size increases while the density sharply decreases. Forests of CNTs visible at 10 minutes reaction time come together to form nano-agglomerated cotton balls or ribbon-like structures at higher carbon yield. Rods of CNTs having tube diameters of 10 nm and lengths of about 5 microns were observed by TEM and SEM analysis.

Figure 3:
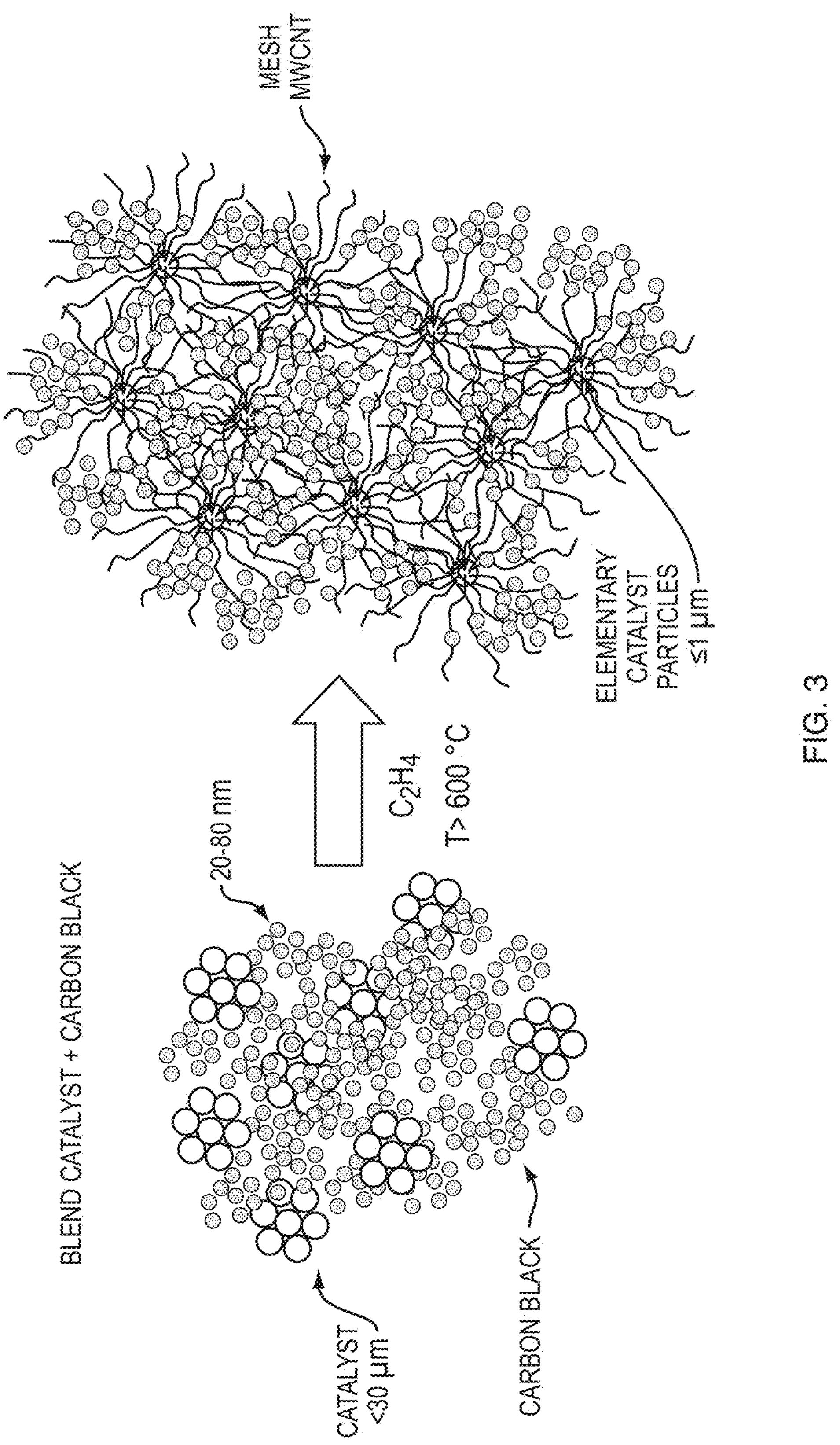
FIG. 3 is a proposed model of CNT mesh carbon black hybrid material formation.

FIG. 3 illustrates a CNT mesh-carbon hybrid material concept of the disclosure. Metal oxide supported catalyst grains in powder form (<30 microns size) are blended with carbon black agglomerates also in powder form and having hundreds of nanometers to micron sizes. The elementary carbon particles show about 20 to 80 nm sizes and form aggregates of a few hundred nm in size. When this powder blend is fed into the reactor at high temperature and then contacted with the carbon source, the elementary catalyst particles of a few microns in size that form the grains start separating from each other and deagglomeration of the carbon black particles is produced due to the formation of a mesh of CNTs. When the MWCNT yield increases, the density and sizes of the agglomerates of carbon particles decrease continuously in the hybrid material. The degree of dispersion of the carbon black aggregation is higher in the CNT-carbon black hybrid material than in carbon black. This same concept can be applied to graphite and activated carbon and other materials such as metal oxides.

Deagglomeration of particles of the second material that the metal-oxide supported catalyst (i.e., the first material) has been blended with (e.g., different forms of carbon, or metal oxide(s)) is accomplished due to the formation of a mesh of CNTs that are grown on the supported catalyst. Deagglomeration of the second material results in an expanded network comprising a mesh of CNT interspersed among less dense agglomerates of the second material. The CNT mesh is intimately interspersed with the particles of the second material. In some examples the CNT is proximate to the surface of the dispersed particles of the second material. In some examples the CNT is directly coupled to particles of the second material. These expanded networks or hybrid material can be mixed with polymers and elastomers to create other hybrid materials. These hybrid materials can have different properties than the polymer or elastomer. For example, the conductivity of the material can be increased, or it can be maintained but at lower CNT loading. Also, the expanded network can strengthen the hybrid material. Higher conductivity and/or increased strength with lower loadings of CNT can be accomplished with these hybrid materials as compared to materials in which the CNT are physically dispersed in the second material. Further, the mixing constraints, effort, and health risks due to possible dispersion of CNT in the air associated with physically dispersing CNT in the second material are avoided by the methods of this disclosure wherein the CNT are grown on metal oxide supported catalyst that has been mixed with the second material.

In some examples the CNT-metal oxide hybrid materials were developed by growing carbon nanotubes on metal oxide supported catalyst that is used to initiate growth in the presence of a carbon source (ethylene, acetylene, methane, carbon monoxide, etc.) by using the Catalytic Chemical Vapor Deposition (CCVD) method in a fluidized bed, moving bed, or rotary tube reactor at temperatures ranging between 300-1000° C. In examples the catalyst active metals consist of a combination of transition elements of the groups VIII and/or VIB of the periodic table. In some examples the catalyst preparation consists of impregnating the catalyst supports in the presence of an aqueous solution containing iron, cobalt, nickel, molybdenum or tungsten and colloidal particles of silica, alumina or titanium hydroxides. The type of carbon nanotubes synthesized (SWCNT, FWCNT and MWCNT) depends on the type of active metals, the carbon source employed and the reaction temperature. The MWCNT-graphite hybrid material obtained in this disclosure delivers superior battery performance when this material is employed as an electrode versus conventional carbon materials in Li-ions batteries, supercapacitors, etc., while the MWCNT-carbon black hybrid materials enhance mechanical properties of elastomers, rubbers, thermoplastics, etc.

Non-limiting illustrative examples follow:

Example 1: Synthesis of SWCNT Mesh on $SiO_2$ Support

Comparative Example

A catalyst was prepared by impregnation of a silica support with a solution containing cobalt and ammonium hepta-molybdate. The impregnated material was aged at room temperature for 3 hrs. under controlled moisture and then dried at 120° C. for 3 hrs. and calcined at 450° C. for 4 hrs. The Co/Mo molar ratio was 0.5. The synthesis of SWCNTs was carried out by using CO as a carbon source in a fluidized bed reactor which was operated at 760° C. temperature, 40 psig and 50 minutes reaction time. The metal oxide precursor catalyst was activated by reduction in the presence of $H_2$ at a temperature of 680° C. before the SWCNT synthesis.

Figure 4B:
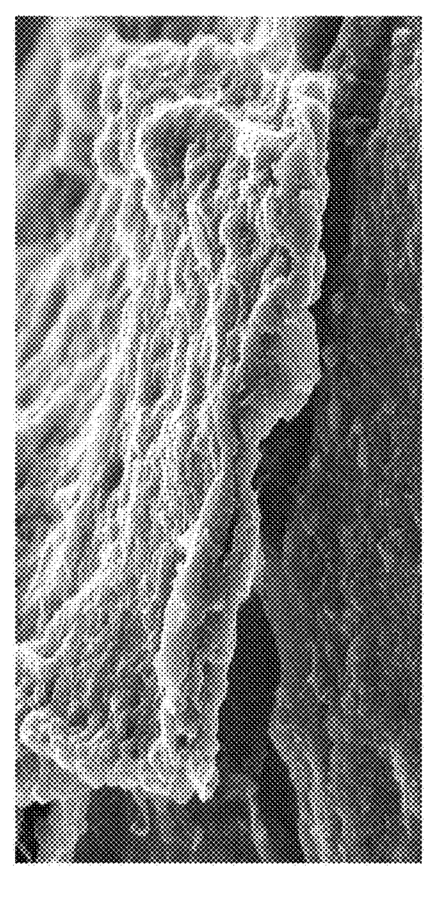
FIG. 4A-4C are SEM images taken at different magnifications corresponding to SWCNT synthesized using a conventional CoMo/$SiO_2$ catalyst.
Figure 4C:
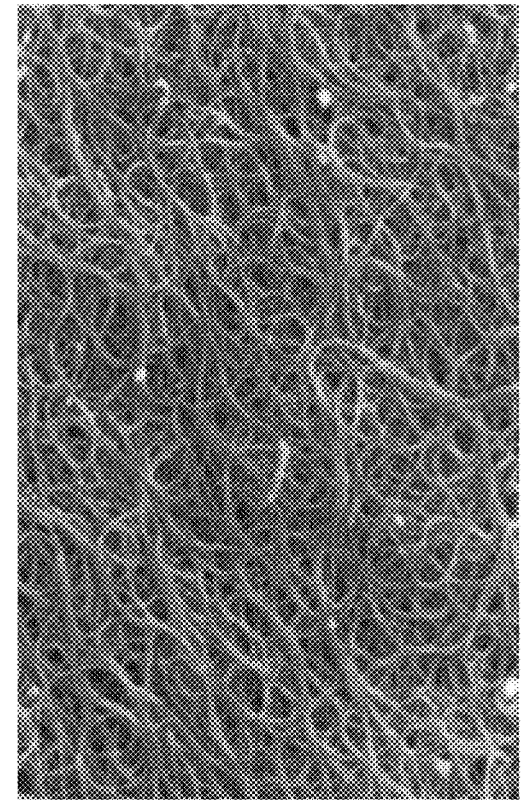
Figure 4A:
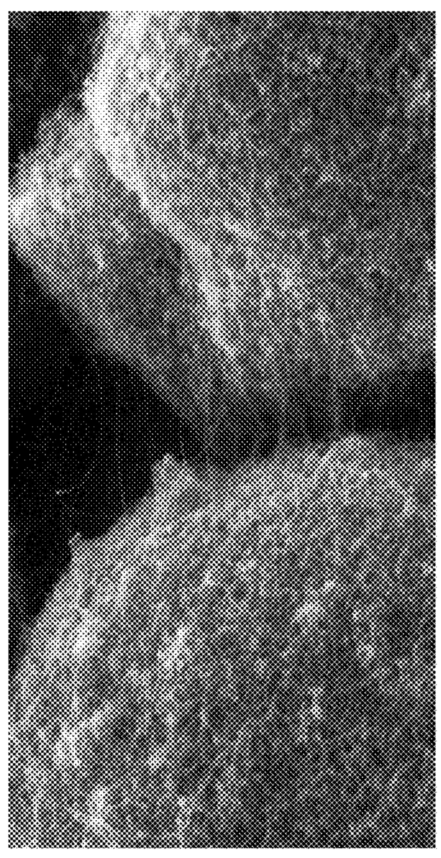

FIGS. 4A-4C are SEM images corresponding to SWCNT synthesized using the CoMo/$SiO_2$ catalyst, taken at 25 kx, 10 kx and 100 kx magnification, respectively. A dense carpet formed by entangled SWCNT can be observed. The tubes are shorter (<3 microns length) and they are difficult to disperse in aqueous surfactant solutions or organic solvent using sonication techniques.

Present Disclosure

This example describes methods for producing SWCNT-$SiO_2$ and SWCNT-Graphite hybrid materials, and the resulting materials. In some examples the methods contemplate using a surface modifier agent (e.g., colloidal silica). The active metals are supported on the substrate by impregnation together with the colloidal silica.

For controlling the CNT growth on a silica support, a metal oxide supported catalyst was prepared by impregnating a silica support with an aqueous solution containing cobalt and molybdenum salts, in the same proportions as in the comparative example above. A commercially-available colloidal silica was mixed with the metal oxide supported catalyst. Aging, drying and calcination steps and SWCNTs synthesis were conducted under the same above experimental conditions.

Figures 5A, 5B, 5C, 5D:
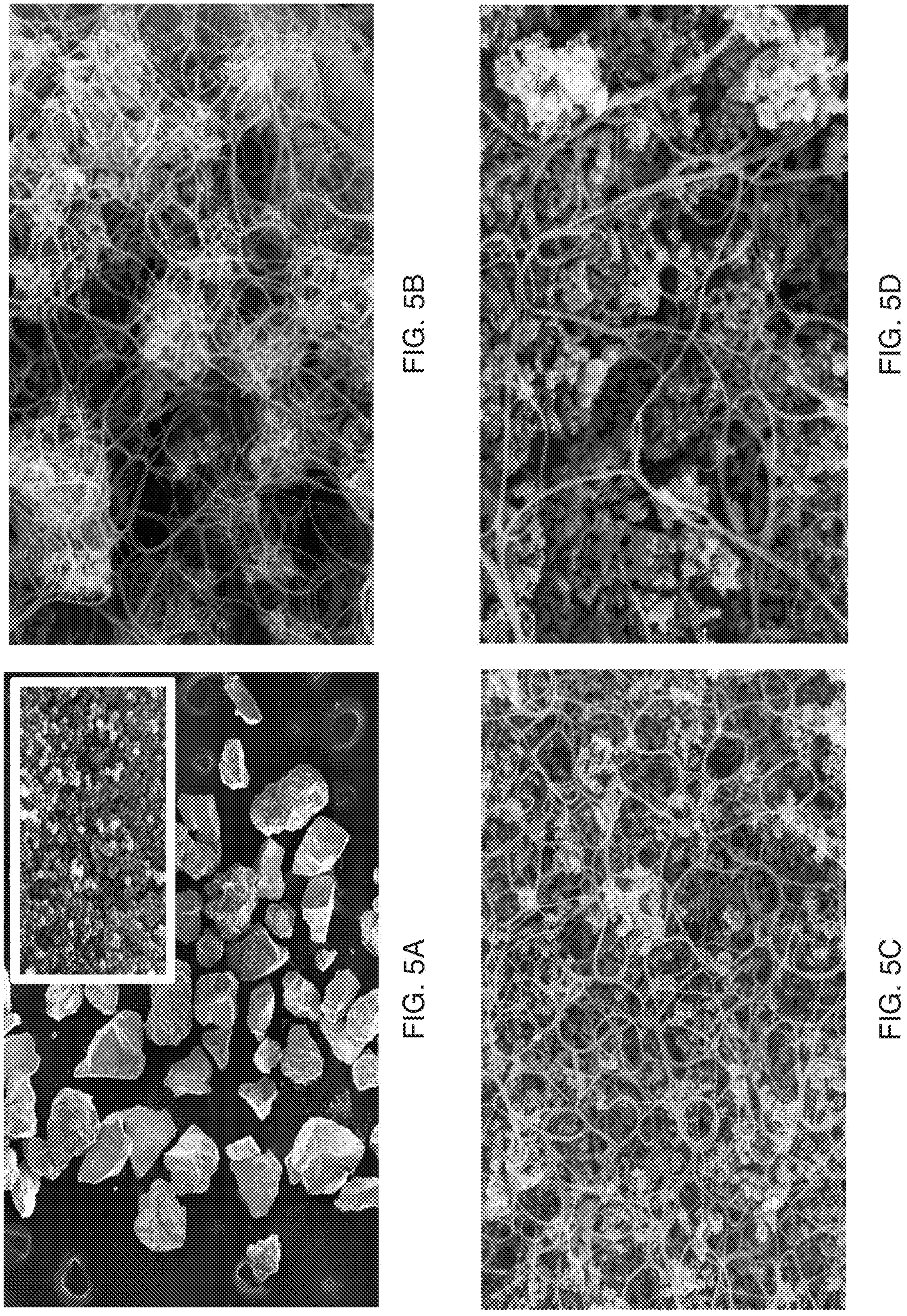
Figures 5E, 5F, 5G:
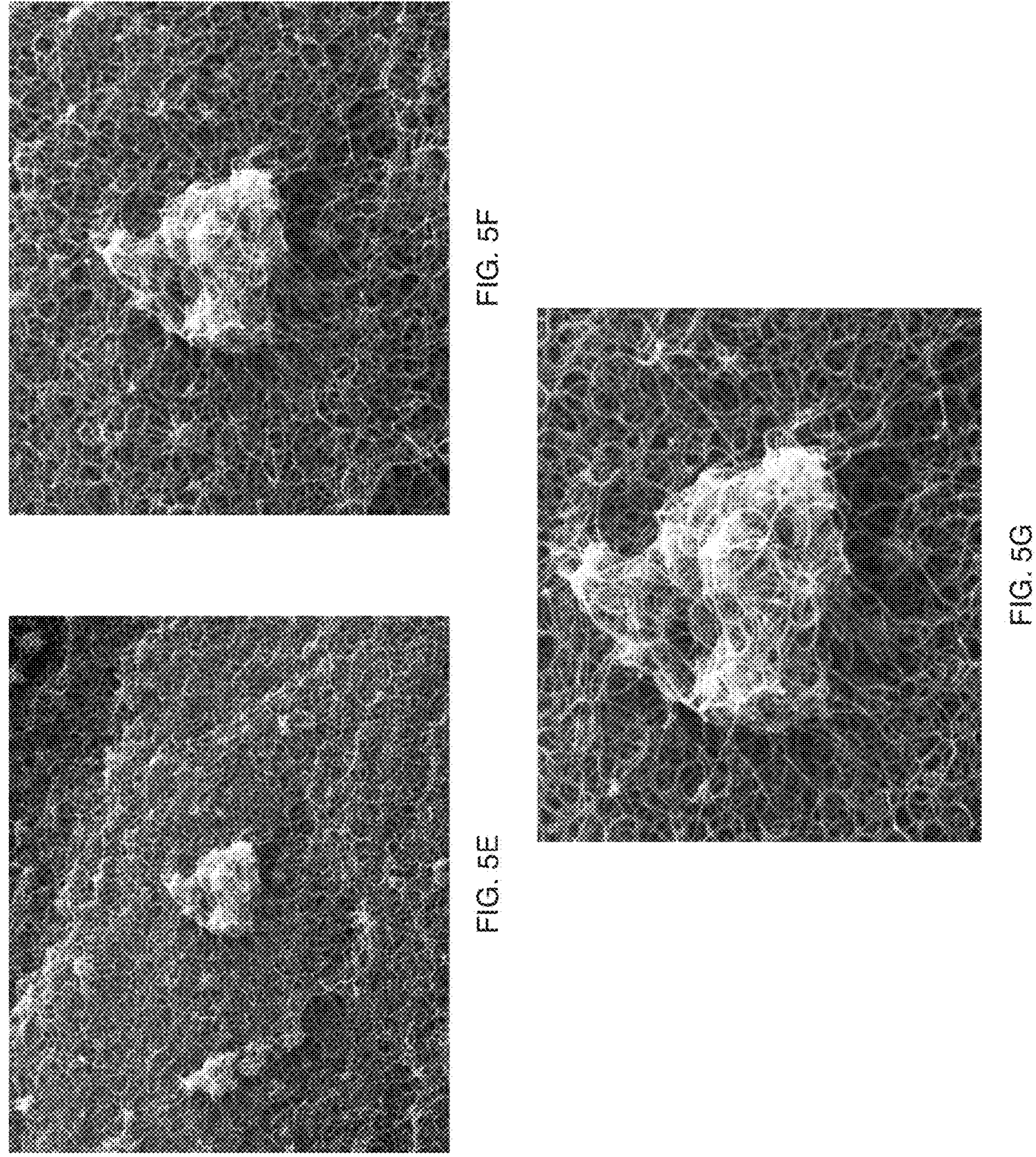
FIGS. 5E-5G are SEM images at different magnifications of SWCNT mesh formation on smaller silica aggregate particles.

FIGS. 5A-5G are SEM images taken at different magnifications corresponding to catalyst particles (FIG. 5A taken at 40×) and SWCNTs synthesized by using the above-described catalyst preparation method. FIG. 5B taken at 50 kx shows a mesh of SWCNT formed on silica nanoparticles. FIG. 5C taken at 50 kx shows a mesh of SWCNT on the $SiO_2$ substrate. FIG. 5D taken at 75 kx shows SWCNT bundles. FIGS. 5E, 5F and 5G illustrate mesh formation on a smaller silica aggregate particle, taken at increasing magnifications. As can be observed in FIGS. 5A-5G, a mesh of SWCNT is formed on both silica nanoparticles coming from the colloidal silica additive, and on the silica support. This mesh is formed from individual long SWCNT bundles having lengths of ≥7 microns. In some examples and in contrast with the comparative example above, the SWCNTs of the present disclosure after purification are easier to disperse in organic as well as in aqueous surfactant solutions, even when using lower sonication power and less time.

Figure 6B:
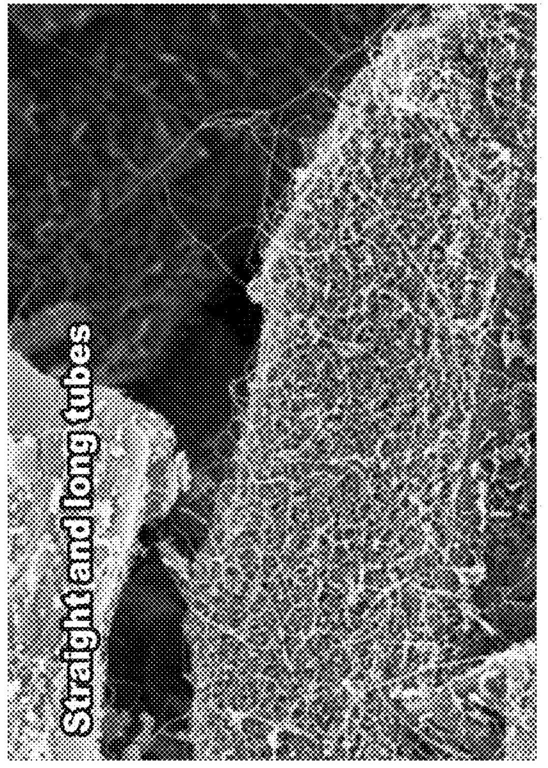
FIGS. 6A and 6B are SEM images at different magnifications of a mesh of long and straight SWCNTs formed on silica nanoparticles from a colloidal silica additive.
Figure 6A:
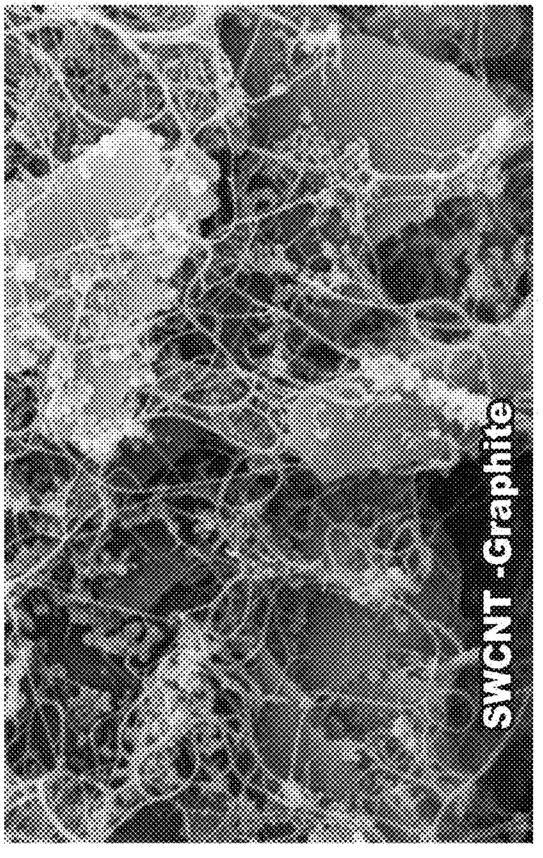

To demonstrate the effect of adding colloidal particles together with the metallic salts in the impregnating solution to control the SWCNTs growth, another catalyst was prepared following the same procedure but in this case, graphite was employed as a catalyst support. SWCNT synthesis was carried out in a rotary tube reactor at the same reduction and reaction temperature and time employed in the previous examples. The SEM images corresponding to the obtained SWCNT-graphite product are shown in FIGS. 6A and 6B that illustrate a mesh of long and straight SWCNTs formed on silica nano-particles that result from a colloidal silica additive, where FIG. 6A is taken at 50 kx and FIG. 6B is a higher magnification close-up view. These images clearly illustrate the formation of meshes of long and straight SWCNTs on the $SiO_2$ nanoparticles coming from the colloidal silica aggregates.

The mesh SWCNTs-silica nanohybrid material is suitable for use in conducting silica, fillers for carbon black mechanical reinforcement, and other applications.

Example 2: Synthesis of CNT-Carbon Black Hybrid

This example (as well as in Example 4 below) describes methods for producing MWCNT-Carbon Black and MWCNT-Graphite using metal oxide supported catalysts. In this case, a fine particle of a metal oxide supported catalyst previously prepared is blended with the carbon material in different proportions to tailor the MWCNT composition in the hybrid material. In some examples a volatile organic solvent (preferably an alcohol) is used in the production of a paste containing both carbon and catalyst fines. Then the dry power is feed into the reactor to conduct the MWCNT synthesis. The MWCNT growth forms an expanded mesh as shown in the SEM images of FIGS. 10A-10C and FIGS. 11A-11F.

As mentioned above, the prior art discloses a blend of carbon nanotubes with polymers, thermoplastics, and elastomers for enhancing their mechanical strength properties, and with graphite or conductive carbon (carbon super-P) to improve the energy capacity of batteries. This approach does not assure an optimum contact between the CNT and the carbon material because of the differences in particle sizes and densities between both types of carbon compound particles.

These technical limitations are solved herein by blending fine powder of a metal oxide supported catalyst (<70 microns particles sizes) with graphite, carbon black or activated carbon in different catalyst/carbon material ratios and then conducting CNT synthesis in a catalytic reactor (fluidized bed or a rotary tube reactor) using ethylene as a carbon source at T=675° C. and different catalyst/gas flow contact times.

Figure 7B:
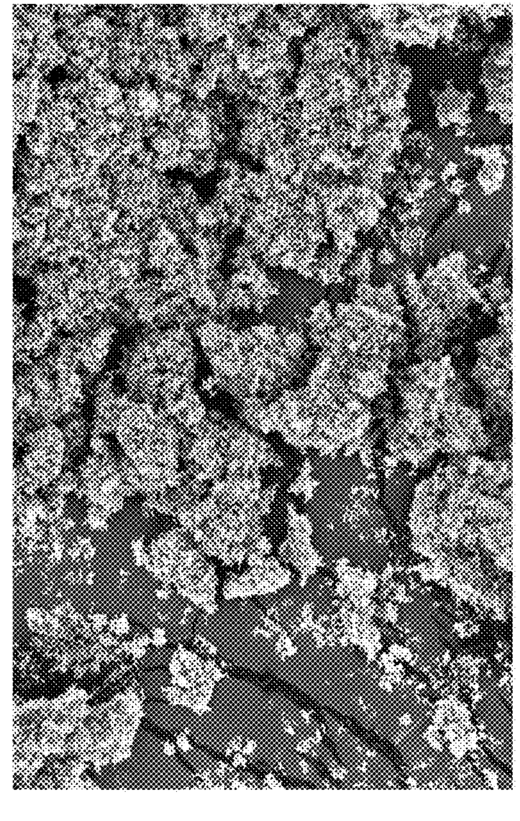
FIGS. 7A and 7B are SEM images at different magnifications of a carbon black starting material.
Figure 7A:
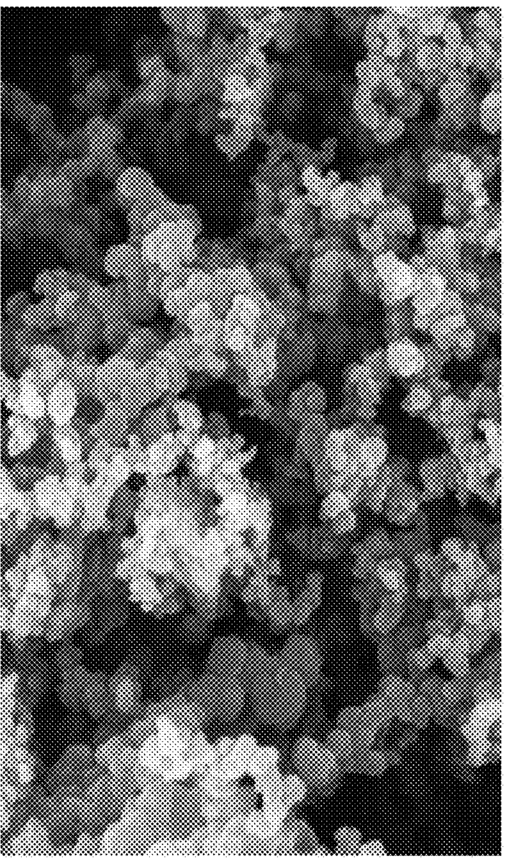

FIGS. 7A and 7B are SEM images of carbon black, where FIG. 7A is taken at 50 kx and FIG. 7B is taken at 800*x*. Spherical primary particles having 20 to 65 nm sizes can be observed. The low magnification SEM image of FIG. 7B shows carbon black agglomerates particles of a few microns in size.

Figure 8B:
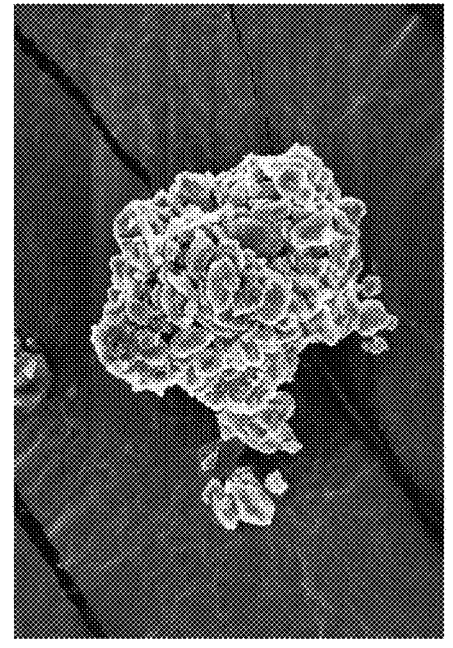
FIGS. 8A-8C are SEM images at different magnifications of a metal oxide supported catalyst.
Figure 8B:
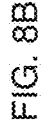
Figure 8C:
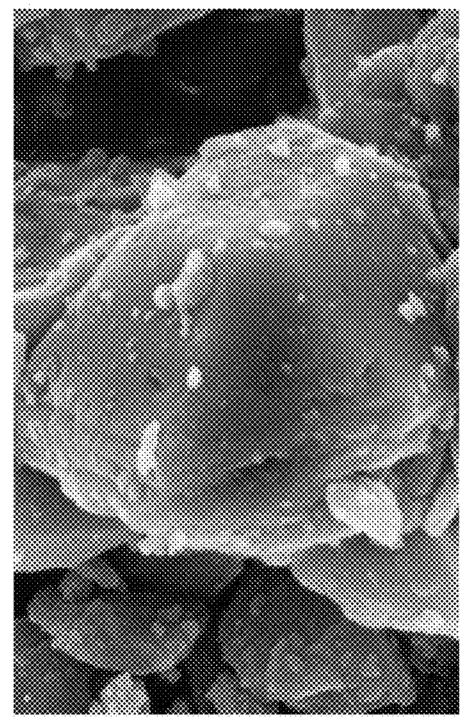
Figure 8A:
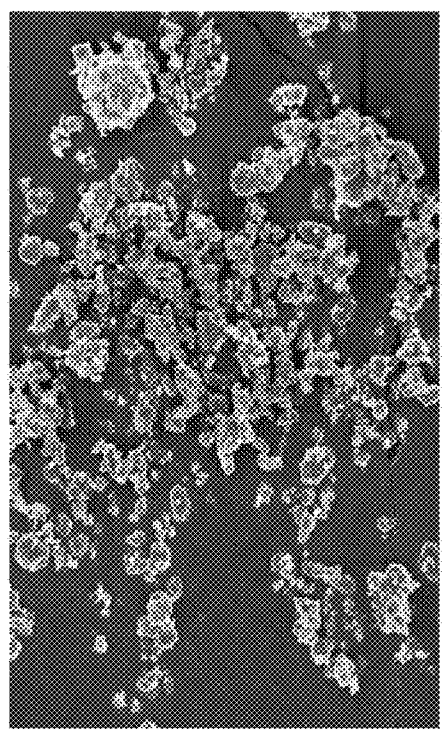

SEM images corresponding to metal oxide supported catalyst (FIGS. 8A-8C) show particles smaller than 10 microns. Primary particles are smaller than 1 micron. FIG. 8A was taken at 2.5 kx, FIG. 8B at 5 kx, and FIG. 8C at 60 kx.

Figure 9B:
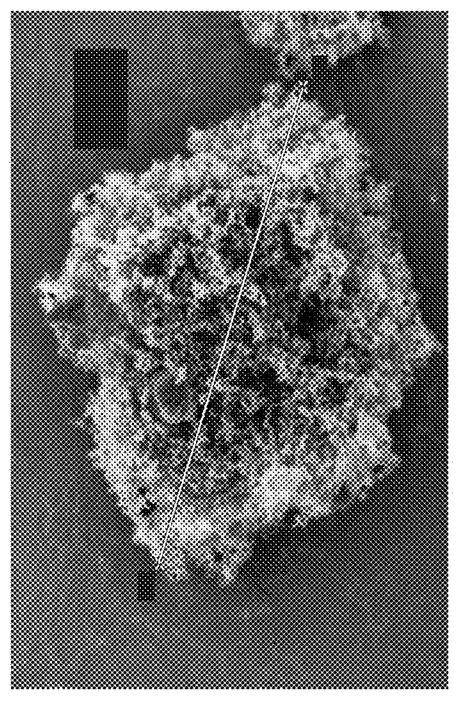
FIGS. 9A-9C are SEM images at different magnifications of a metal oxide supported catalyst-carbon black blend.
Figure 9B:
Figure 9A:
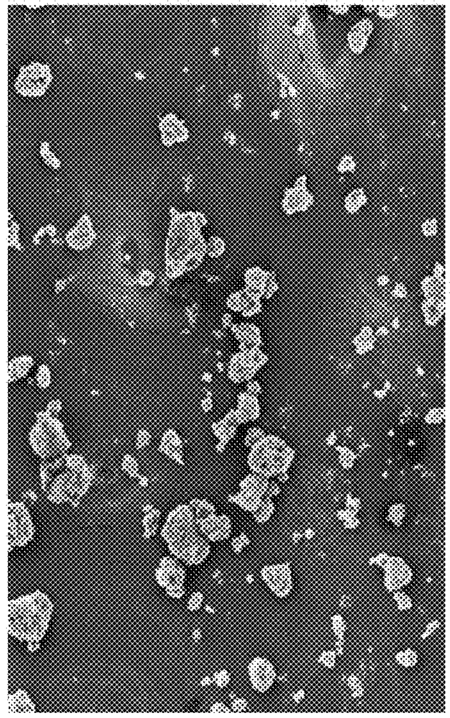
Figure 9C:
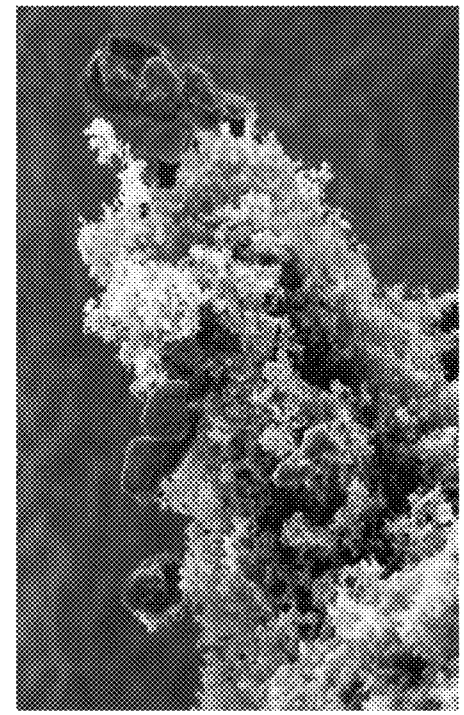

FIGS. 9A-9C are SEM images at different magnifications (150×, 5 k×, and 7.5 k×, respectively) corresponding to a metal oxide supported catalyst-carbon black blend. The images show aggregates having sizes of 15 to 40 microns. Catalyst particles are observed attached to the carbon black particles.

Figure 10B:
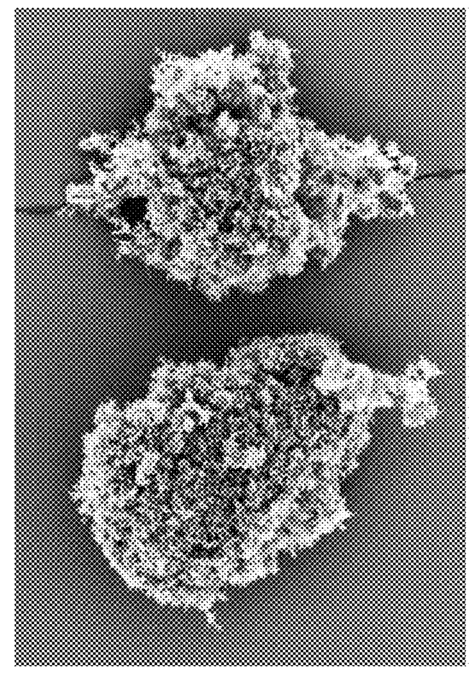
FIGS. 10A-10C are SEM images at different magnifications of a MWCNT-carbon black hybrid material obtained with 15% metal oxide catalyst in the blend.
Figure 10B:
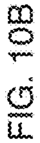
Figure 10A:
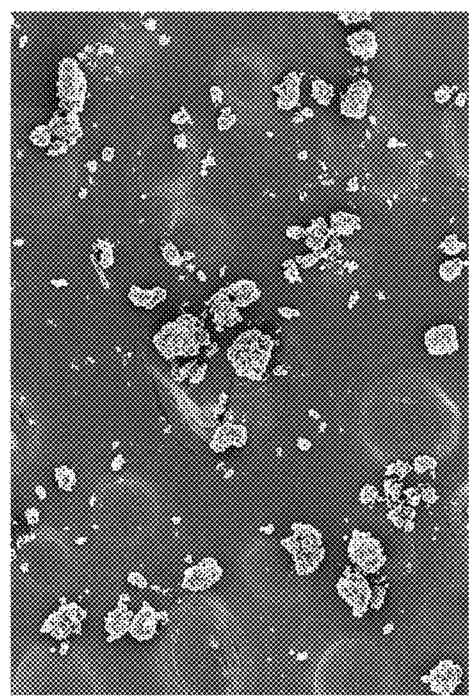
Figure 10C:
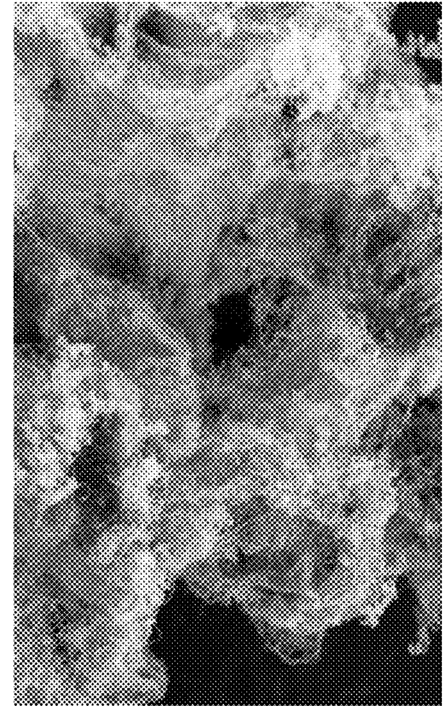

FIGS. 10A-10C are SEM images corresponding to a MWCNT-carbon black hybrid material taken at 100×, 1.25 kx, and 10 kx, respectively). The catalyst composition in the blend was 15 wt %. Aggregates of MWCNT-carbon black ranging between 20 to 60 microns in size are observed. Forests of MWCNTs having 8 to 15 nm diameter are formed. When MWCNTs start to grow, the carbon black agglomerates begin separating from one another, and particle density decreases significantly. Consequently, a high dispersion of carbon black aggregates is achieved.

Figures 11A, 11B, 11C, 11D, 11E, 11F:
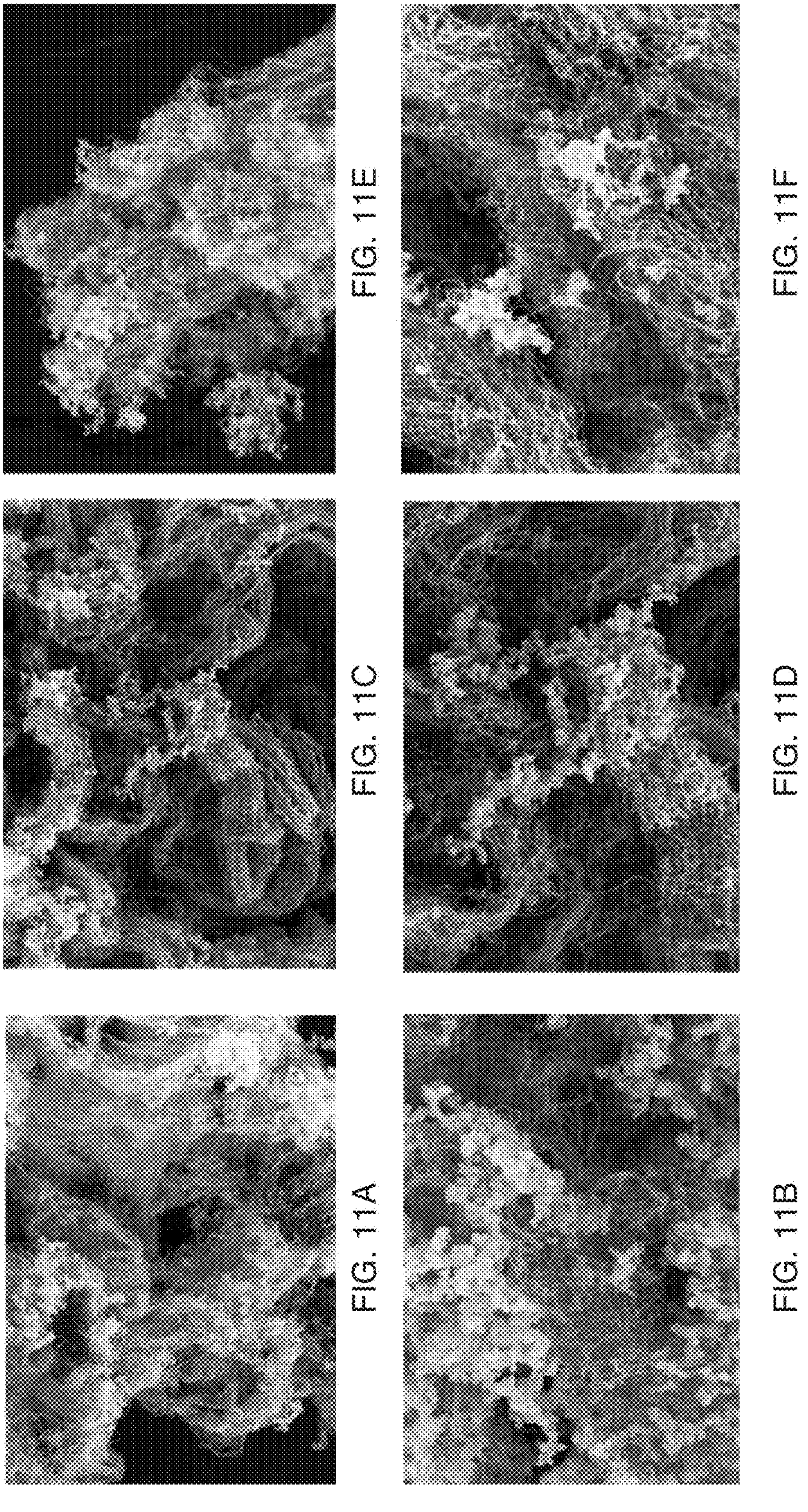
FIGS. 11A and 11B are SEM images at different magnifications of a MWCNT-carbon black hybrid material obtained with 15% metal oxide catalyst in the blend.
FIGS. 11C and 11D are comparative SEM images at the same magnifications of a MWCNT-carbon black hybrid material obtained with 25% metal oxide catalyst in the blend.
FIGS. 11E and 11F are SEM images at the same magnifications of a MWCNT-carbon black hybrid material obtained with 50% metal oxide catalyst in the blend.

FIGS. 11A-11F are SEM images at different magnifications of MWCNT-carbon black hybrid material obtained at 15 wt % catalyst composition in the blend (FIGS. 11A and 11B taken at 10 kx and 25 kx, respectively), 25 wt % catalyst composition in the blend (FIGS. 11C and 11D taken at 10 kx and 25 kx, respectively), and 50 wt % catalyst composition in the blend (FIGS. 11E and 11F taken at 10 kx and 25 kx, respectively). When increasing the catalyst composition in the blend, a greater dispersion of the carbon black aggregates is achieved, and a more intimate contact between MWCNT-carbon black particles is also achieved.

Table 1 provides certain properties of carbon black and MWCNT carbon-black hybrid materials synthesized using different catalyst compositions in the blend. When increasing the catalyst composition in the blend, several effects were observed. For one, MWCNT content in the product increases, also, both BET surface area and pore volume values increase significantly. Also, tap bulk density decreases and MWCNT-carbon black agglomerate size increases. In some examples one or more of the BET surface area, pore volume, tap bulk density, residual mass, weight percent of CNT and of the second material, TGA results, and mean particle size (and other qualities of the hybrid materials) are determined using standard test methodologies.

Figures 12A, 12B, 12C, 12D:
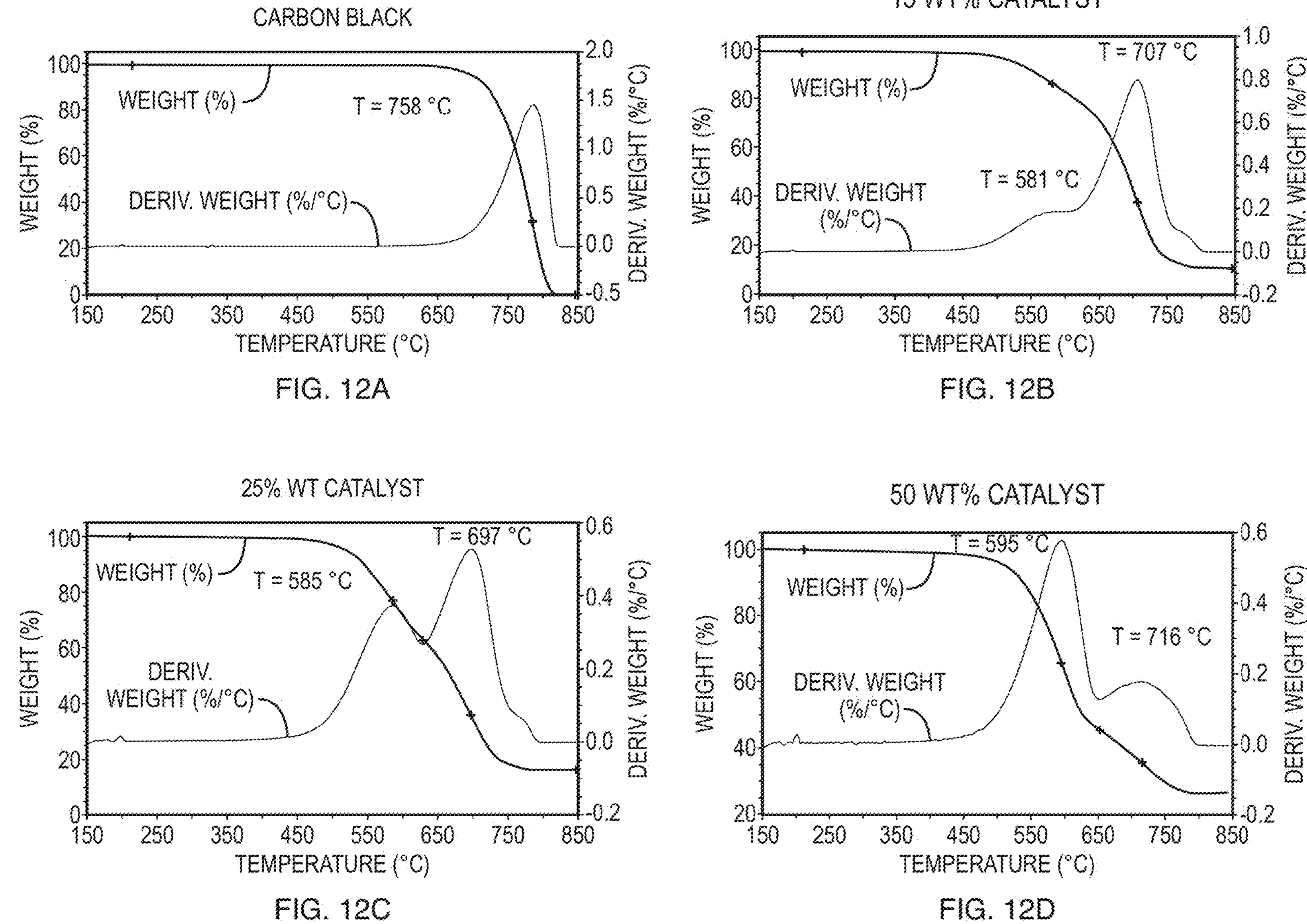
FIGS. 12A-12D are thermogravimetric (TGA) analyses of carbon black, a MWCNT-carbon black hybrid material obtained with 15% metal oxide catalyst in the blend, a MWCNT-carbon black hybrid material obtained with 25% metal oxide catalyst in the blend, and a MWCNT-carbon black hybrid material obtained with 50% metal oxide catalyst in the blend, respectively.
Figures 13A, 13B, 13C, 13D:
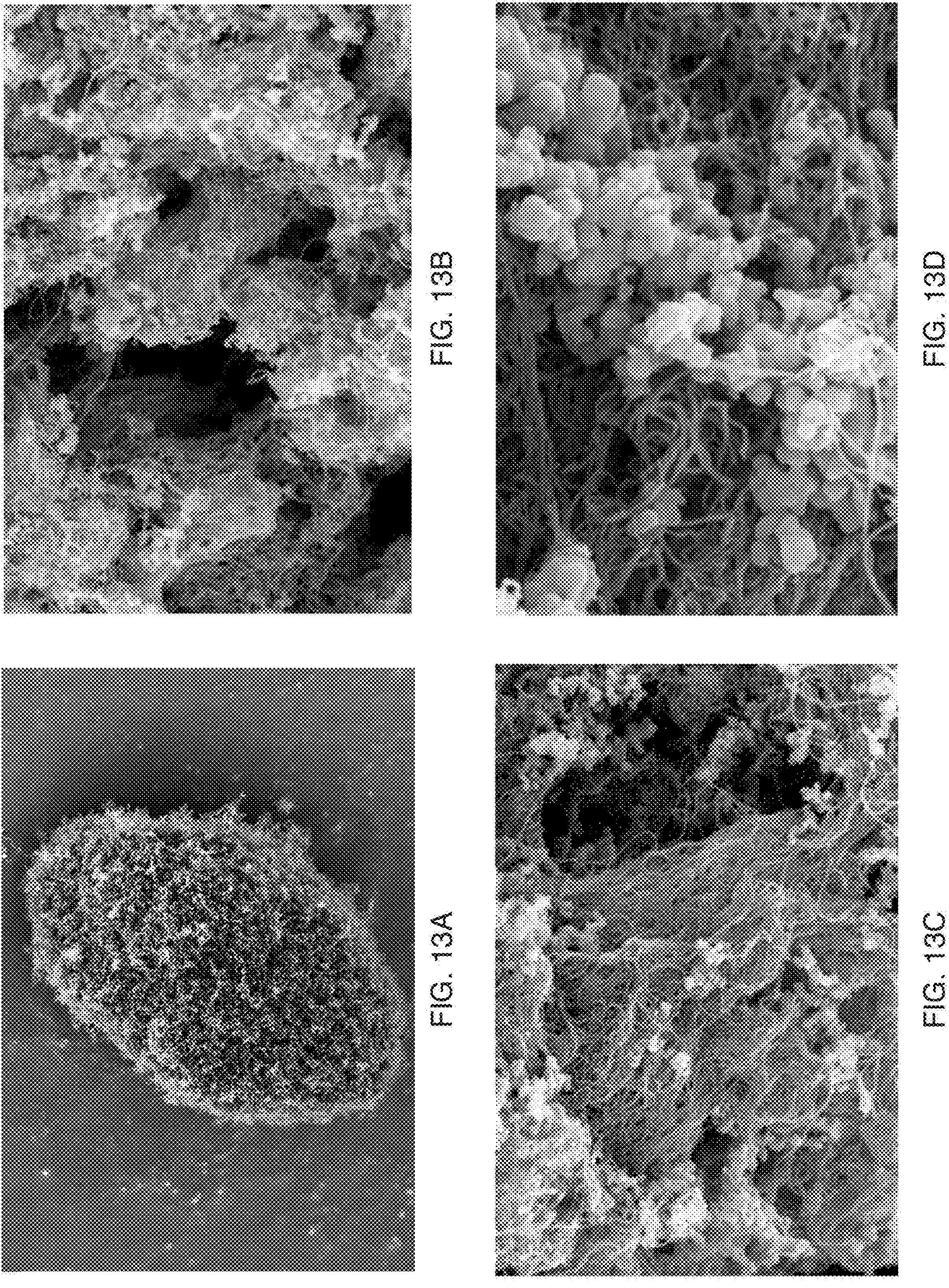
FIGS. 13A-13D are SEM images at different magnifications of a MWCNT-carbon black hybrid material after it has been purified.
Figure 15:
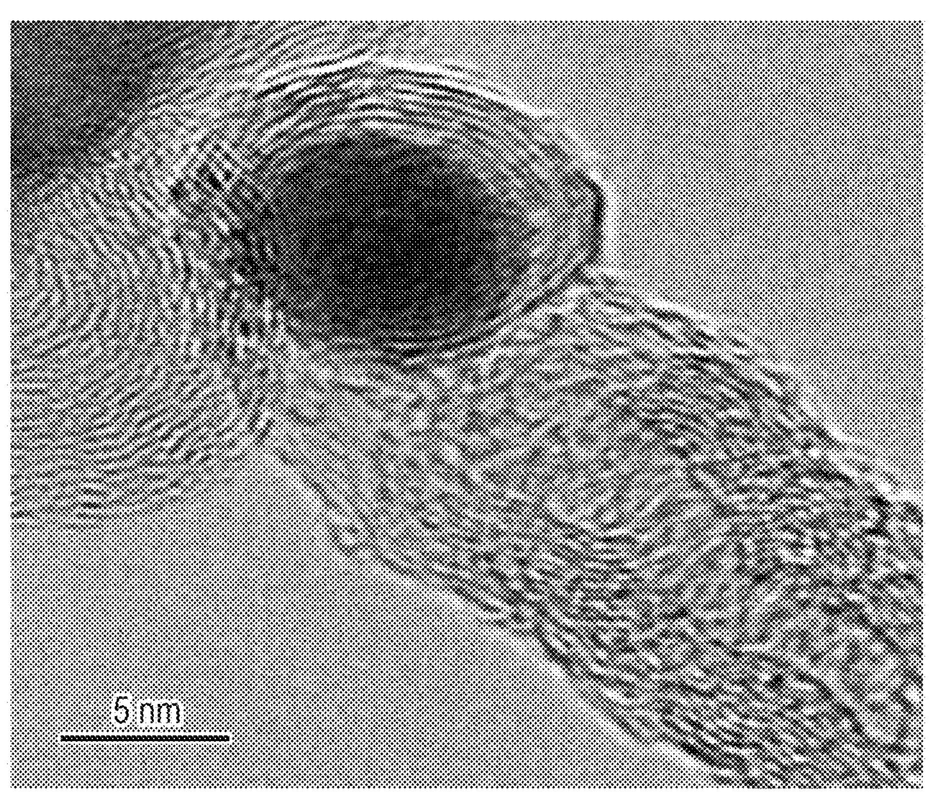
FIG. 15 is a TEM image showing a metal encapsulated by a graphite coating.
Figure 16A:
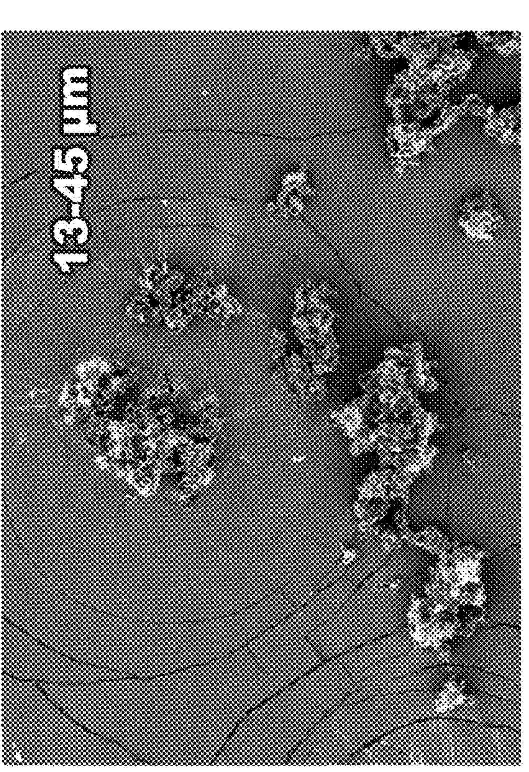
FIGS. 16A-16D are TEM images at different magnifications of a MWCNT-graphite hybrid material.
Figure 16B:
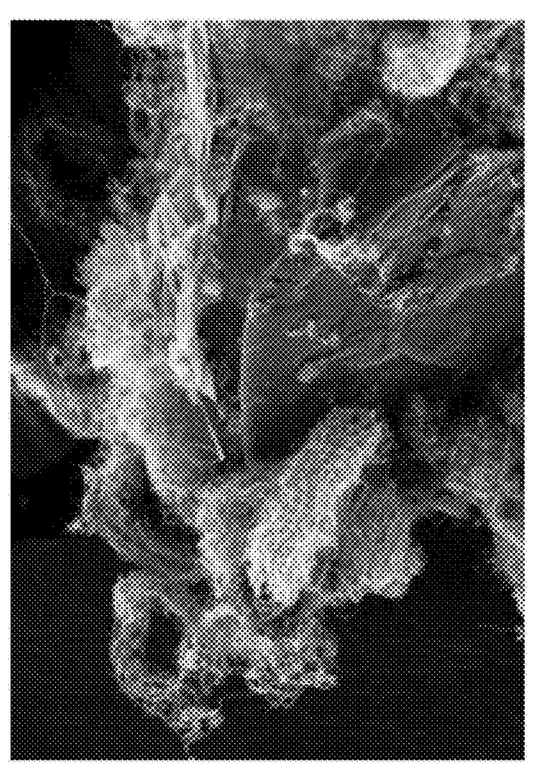
Figure 16C:
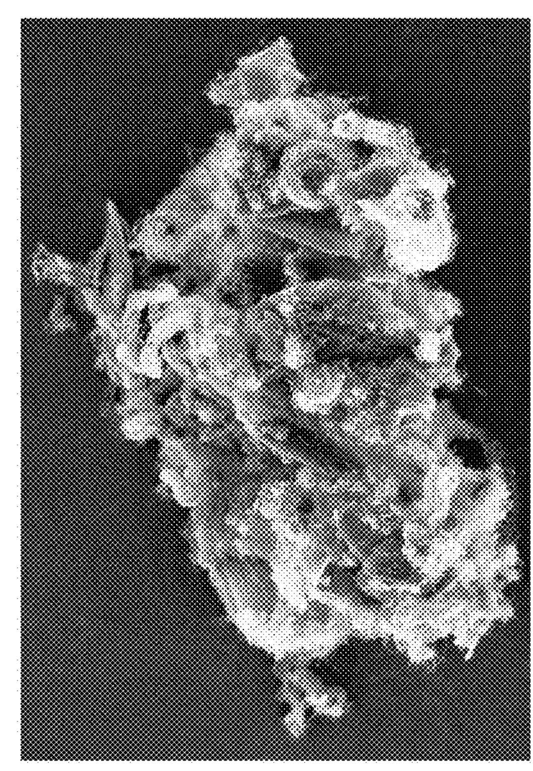
Figure 16D:
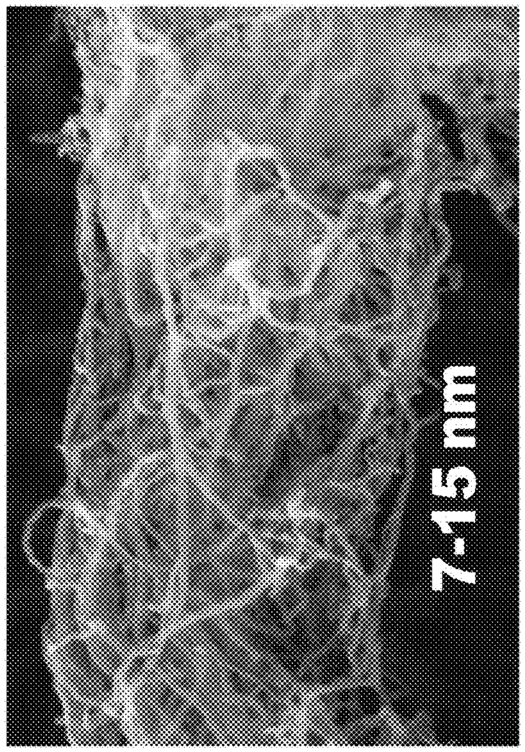

FIGS. 12A-12D are TGA analyses of carbon black (FIG. 12A) and MWCNT-carbon black hybrid materials obtained by using different catalyst compositions (FIG. 12B 15% catalyst, FIG. 12C 25% catalyst, and FIG. 12D 50% catalyst). One can distinguish two different signals for the MWCNT-carbon black hybrid whose relative intensities vary as a function of the catalyst compositions in the blend. The low temperature signal is attributed to a MWCNT combustion pattern while the high temperature signal corresponds to carbon black. The low temperature signal increases continuously when increasing the amount of catalyst in the blend, meaning that more catalyst leads to more MWCNT.

TABLE 1

Properties of the MWCNT-Carbon black hybrid material at different catalyst compositions

| Blend composition (wt %) | Residual mass (ash wt %) | MW CNT (wt %) | CB (wt %) | TGA Max Temp (° C.) | BET S.A (m2/g) | Pore volume (ml/g) | Tap bulk density (g/ml) | Mean Part. Size (μm) |
|---|---|---|---|---|---|---|---|---|
| 100% Carbon Black | 0.44 | — | 99.56 | 758 | 48 | 0.17 | 0.310 | 13 |

TABLE 1-continued

Properties of the MWCNT-Carbon black hybrid material at different catalyst compositions

| Blend composition (wt %) | Residual mass (ash wt %) | MW CNT (wt %) | CB (wt %) | TGA Max Temp (° C.) | BET S.A (m2/g) | Pore volume (ml/g) | Tap bulk density (g/ml) | Mean Part. Size (μm) |
|---|---|---|---|---|---|---|---|---|
| 50% catalyst | 24.8 | 43.4 | 31.2 | 595/716 | 274 | 1.06 | 0.053 | 94 |
| 25% catalyst | 19.4 | 22.6 | 58.0 | 585/697 | 207 | 0.63 | 0.090 | 58 |
| 15% catalyst | 11.8 | 13.4 | 75.8 | 580/707 | 140 | 0.43 | 0.102 | 42 |

In some examples an analysis technique used to determine the sizes of catalyst, carbon black and hybrid material aggregate sizes is light scattering, e.g., laser diffraction. The mean particle size was determined using the laser diffraction technique. This technique allows the determination of the size of the carbon black aggregates and the nanoaggregates formed when CNT is grown using different catalyst/carbon black compositions. The technique is thus able to measure the size of the CNT-carbon black mesh that is formed. When more catalyst is used the CNT-carbon black mesh is larger because a larger number of high aspect ratio MWCNTs grow.

Figure 14:
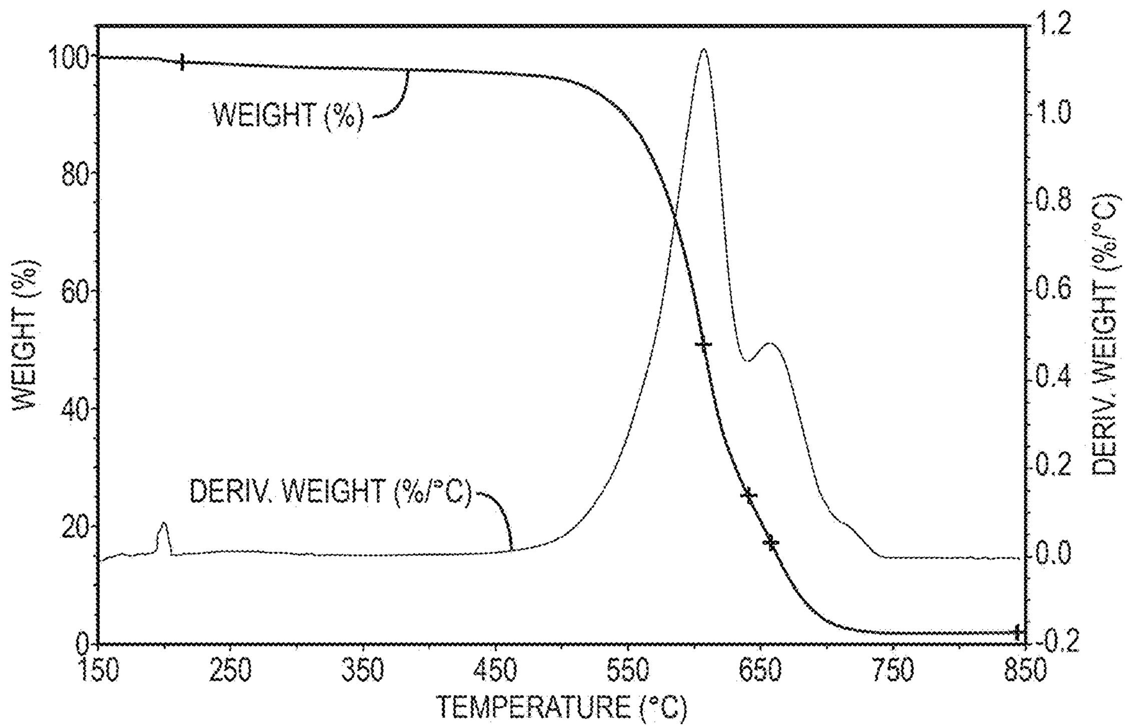
FIG. 14 is a TGA analysis of a purified MWCNT-carbon black hybrid material.

Example 3: Properties of the CNT-Carbon Black Hybrid Material after Purification In order to investigate the effect of chemical purification on the structure and morphology properties of the MWCNT-carbon black hybrid material, the sample obtained by using 50% catalyst composition in the blend was treated with a solution containing a mix of acid containing 3M $H_2SO_4$ and 3M HCl at 85° C. for 3 hours to remove the metal oxide catalyst support and any active metal catalyst particles that are not encapsulated by carbon from the product. An alternative is to use an HF solution for purification. FIGS. 13A-13D are SEM images corresponding to the MWCNT-carbon black purified product, taken at 2.5 k×, 12 k×, 20 k×, and 60 k×, respectively). One can observe that the MWCNT-carbon black purified product preserves the same mesh structure as the non-purified sample. No carbon nanotubes were observed detached from the carbon black aggregates. TGA analysis in FIG. 14 confirms these results, with marked data points from left to right on the weight % curve at 213.64° C. and 98.97%, 606.99° C. and 51.01%, 640.89° C. and 25.44%, and 843.56° C. and 2.199%. The residue is mainly composed of a metal encapsulated by a graphite coating, as shown in the TEM image of FIG. 15. BET surface area and pore volume of the purified product is 266 $m^2/g$ and 1.18 cc/g, respectively, that is comparable with the non-purified sample (Table 1).

The MWCNT-carbon black can also be purified by using chlorine gas and/or high temperature thermal treatments. This procedure enables breaking the graphite coating encapsulating the metal catalyst particles, which are removed from the solid at very high temperatures (greater than 1000° C.) under vacuum. This purification method may be more effective than the chemical digestion method for removing metal-carbides impurities from the sample.

Example 4: Synthesis of CNT-Graphite Hybrid

Figure 17:
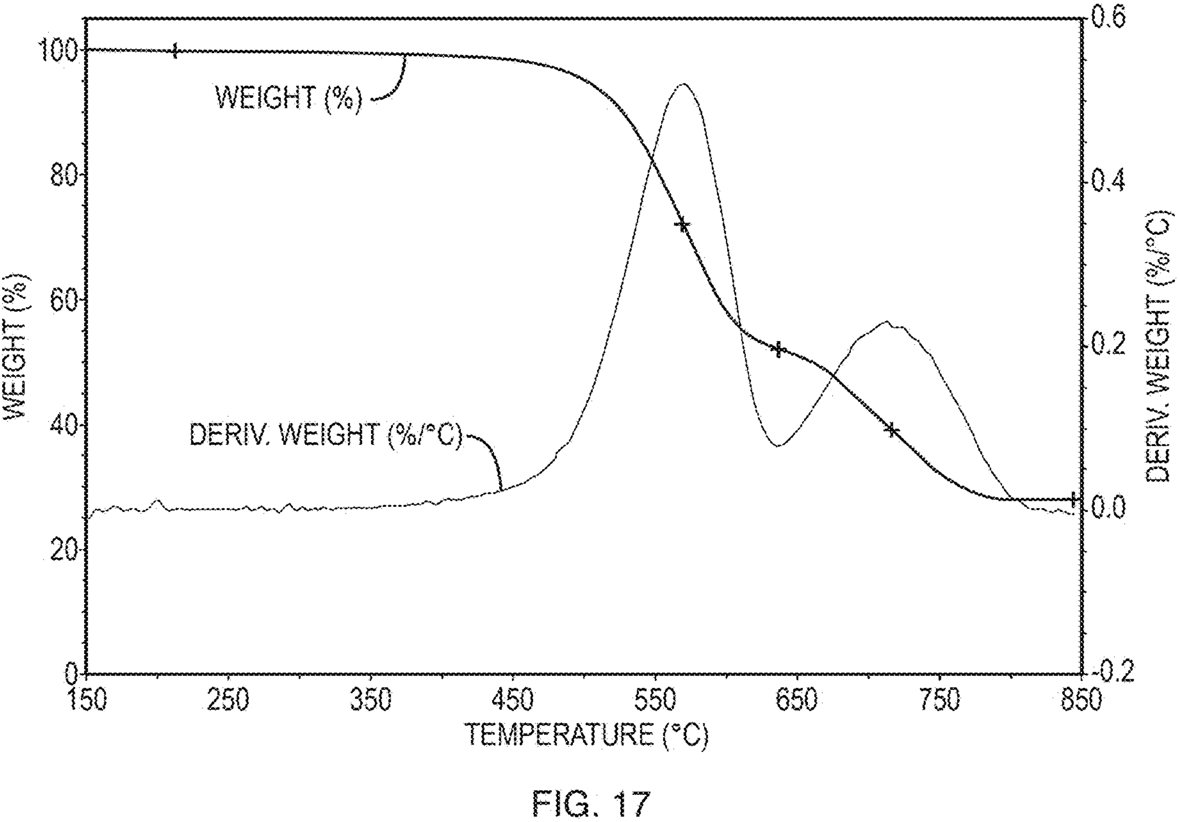
FIG. 17 is a TGA analysis of a MWCNT-graphite hybrid material.

In this example, a metal oxide supported catalyst was blended with natural graphite particles (50%/50% by weight) with sizes of 5 to 30 microns. The CNT synthesis was carried out under the same experimental conditions as used in Example 2. FIGS. 16A-16D are SEM images taken at different magnifications (400×, 10 k×, 4 k×, and 100 k×, respectively) corresponding to the MWCNT-graphite hybrid material. It is observed that graphite particles having 13-45 microns size are covered by a mesh of MWCNTs having 7 to 15 nm diameter. Table 2 shows the properties of the graphite employed and the synthesized CNT-graphite hybrid. The estimated MWCNT in the product as produced is about 44 wt %, BET and pore volume increased from 18 $m^2/g$ and 0.069 cc/g to about 285 $m^2/g$ and 0.97 cc/g while the tap bulk density decreased from 0.18 cc/g to about 0.050 cc/g. TGA analysis (FIG. 17) shows two separate signals whose maximum combustion temperature rates at 570° C. and 716° C., corresponding to MWCNT and graphite, respectively, with marked data points from left to right on the weight % curve at 212.93° C. and 99.95%, 569.73° C. and 72.06%, 636.95° C. and 52.17%, 716.33° C. and 39.34%, and 843.63° C. and 27.81%. The mean particle size increased after the MWCNT deposition on the graphite particle surface.

TABLE 2

Properties of graphite and MWCNT-graphite hybrid

| | MWCNT (ash) (wt %) | Residue (ash) (wt %) | TGA (° C.) | MPS μm | BET S.A $m^2/g$ | Pore volume (cc/g) | Tap bulk density (g/ml) |
|---|---|---|---|---|---|---|---|
| Graphite | — | 0.35 | 778 | 9 | 18 | 0.069 | 0.180 |
| MWCNT/Graphite hybrid | 44.0 | 23.3 | 570/716 | 75 | 285 | 0.96 | 0.050 |

Example 5: Few Walled Carbon Nanotube-Carbon Hybrid Material

This example describes methods for producing few-walled carbon nanotube (FWCNT)—with different carbon materials (graphite, graphene, carbon black, activated carbon, etc.). The FWCNT is defined by a family of CNTs having 1 to 4 walls, most of them between 2 to 3 walls. A metal oxide supported catalyst is blended with the carbon materials in 5 to 50 wt % content range composition using the methods described above. The hybrid FWCNT-carbon material is produced in a rotary tube reactor or fluidized bed reactor using different carbon sources (such as; acetylene, methane, aromatics, alcohol, etc.), $H_2$ and/or an inert gas at temperatures between 400° C. and 1000° C. Both active metal oxide precursors as well as catalyst supports were described above.

Figure 18A:
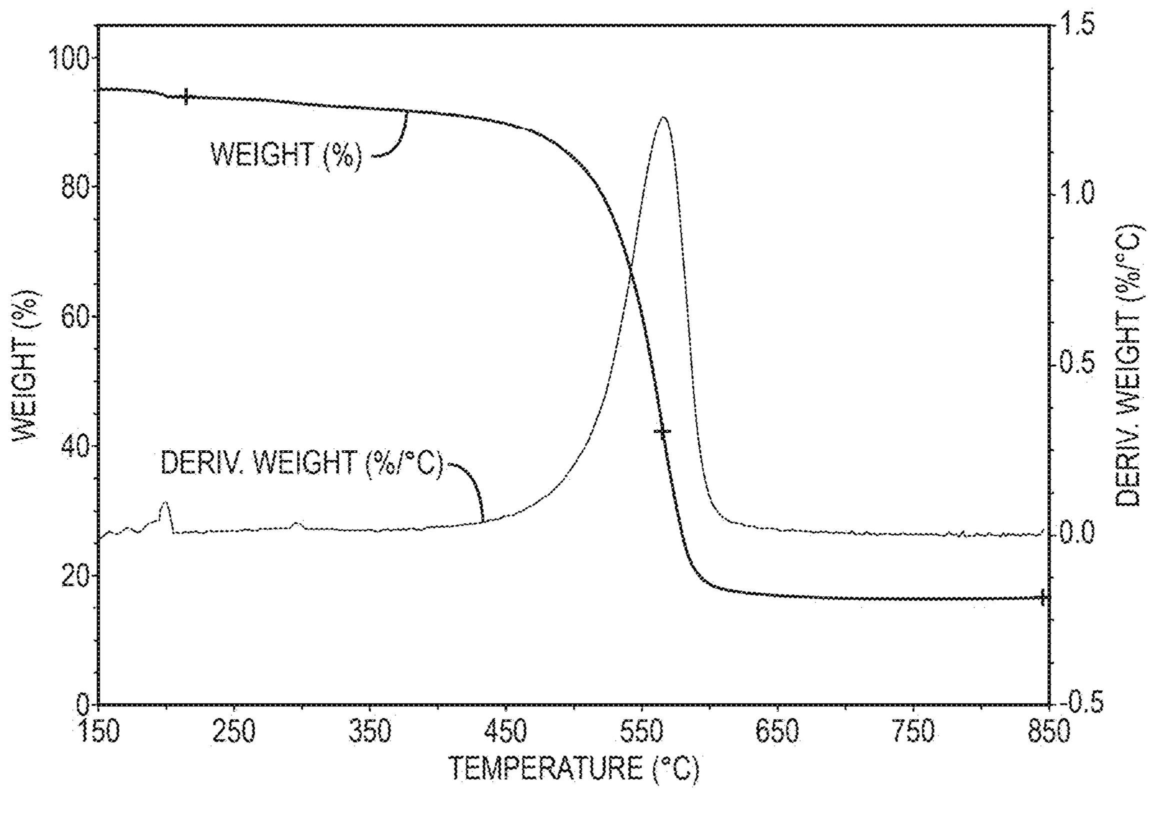
FIG. 18A is a TGA analysis of FWCNTs and FIG. 18B is a TGA analysis of a FWCNT-graphite hybrid material after purification.

FWCNT was synthesized using a FeMo/MgO catalyst in a rotary tube reactor at a T=950° C., gas composition=20% v $CH_4$ in $H_2$, catalyst weight/gas flow ratio=1 g catalyst/L, and a reaction time of 5 minutes. The FWCNT product was purified by digesting the residual catalyst particles in 3M nitric acid before characterization analysis. TGA analysis of purified FWCNT is shown in FIG. 18A. A single signal was observed at about 565° C., which correspond to the maximum combustion rate temperature. Marked data points from left to right on the weight % curve are at 213.64° C. and 93.80%, 565.32° C. and 42.07%, and 844.98° C. and 16.38%.

Figure 18B:
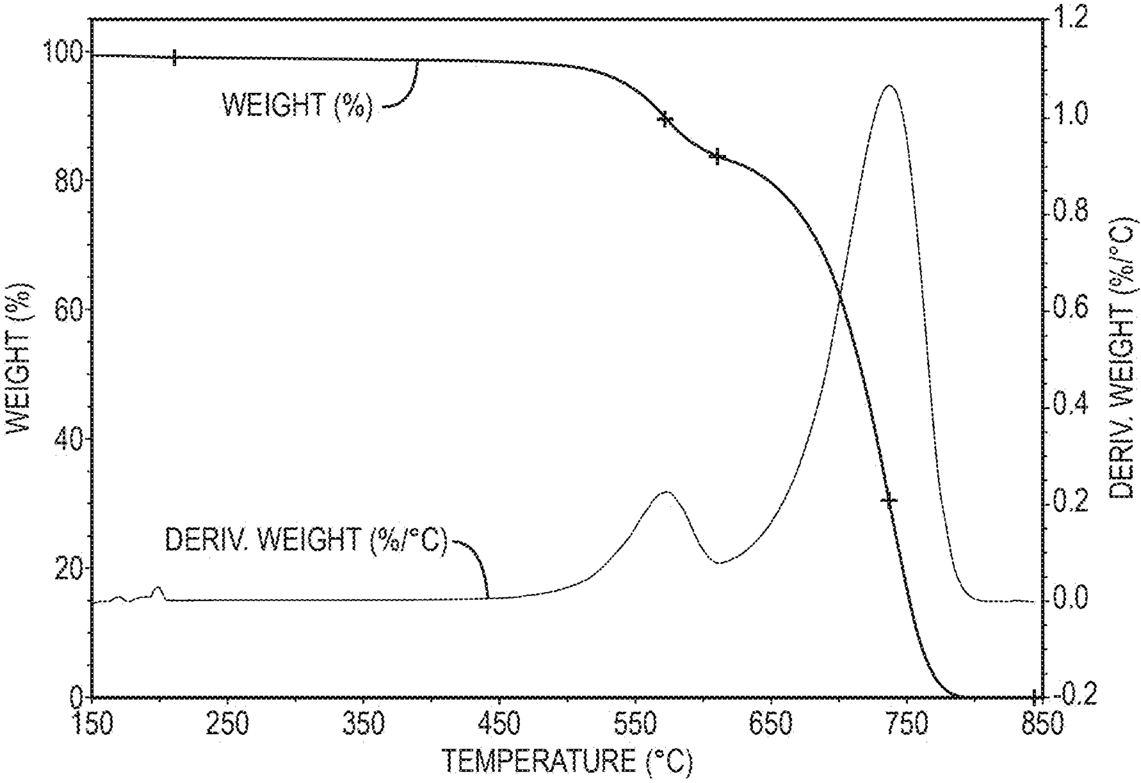

In the next experiment fine particles of the FeMo/MgO catalyst were blended with graphite powder in 50/50 wt % proportion according to the procedure described in Example 2. FWCNTs-graphite hybrid material synthesis and purification were carried out under the same conditions described above. FIG. 18B shows the TGA analysis of the FWCNT-graphite hybrid material after purification where two well separated signals can be observed, at 573° C. and at 737° C. They correspond to FWCNTs and graphite, respectively. The estimated FWCNT content in the hybrid material is about 15 wt %. Marked data points from left to right on the weight % curve are at 211.52° C. and 99.18%, 573.09° C. and 89.72%, 611.23° C. and 83.91%, 737.64° C. and 30.72%, and 844.98° C. and 0.1496%.

Figure 19B:
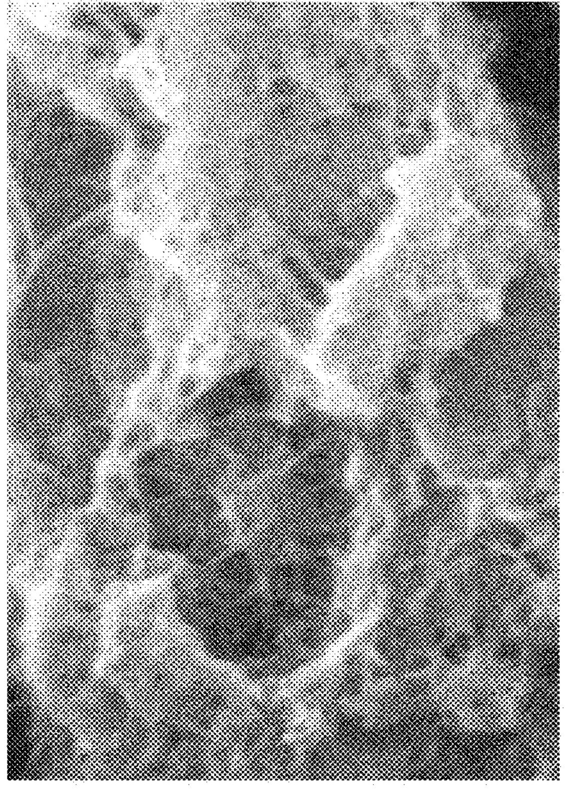
FIGS. 19A and 19B are SEM images of a FWCNT-graphite hybrid material as produced and after purification, respectively.
Figure 19A:
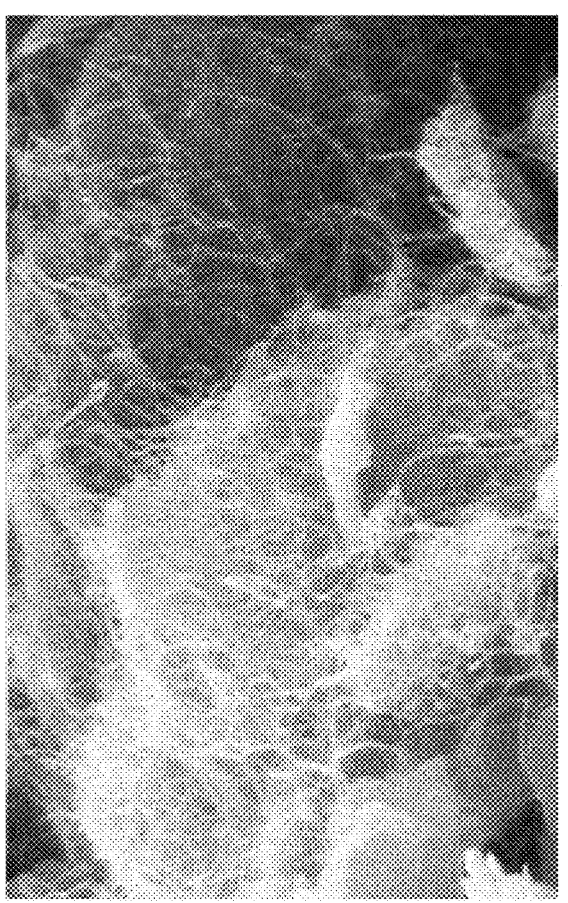

FIGS. 19A and 19B are SEM images corresponding to FWCNT-Graphite hybrid material as produced and after purification, respectively. In both cases, a mesh of CNTs covering the graphite particles is observed.

Example 6: Synthesis of CNT-Carbon Black and CNT-Graphite Hybrid Materials in Fluidized Bed Reactor This example describes a method for producing CNT-Carbon black and CNT-Graphite hybrid materials in fluidized bed reactors. A metal oxide supported catalyst precursor is blended with the carbon materials in a 40/60 wt % proportion respectively, following the procedure described in Example 2.

CNT/carbon black and CNT/graphite hybrid materials were synthesized in a fluidized bed reactor at a temperature=675° C., gas composition=75% v $C_2H_4$ in $H_2$, catalyst/gas flow ratio=1.3 g catalyst/l, and a reaction time of 10 minutes.

Figure 20A:
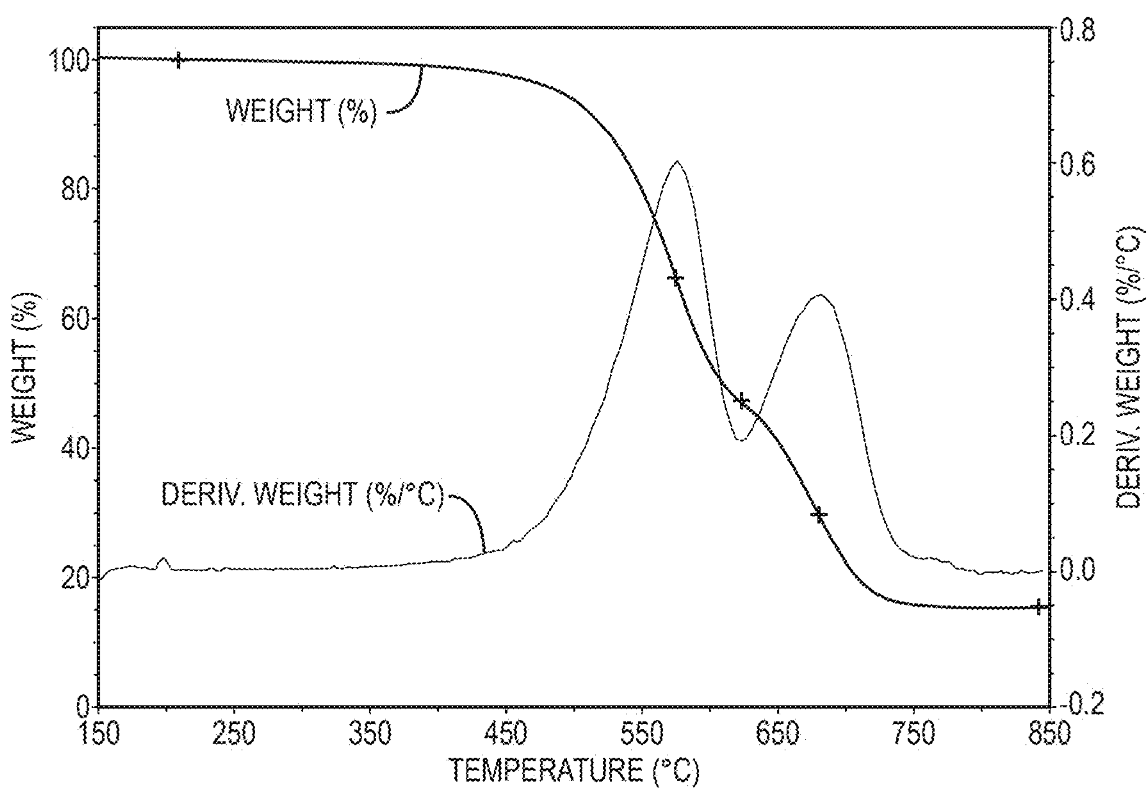
FIGS. 20A and 20B are TGA analyses of a CNT-carbon black hybrid material and a CNT-graphite hybrid material, respectively.
Figure 20B:
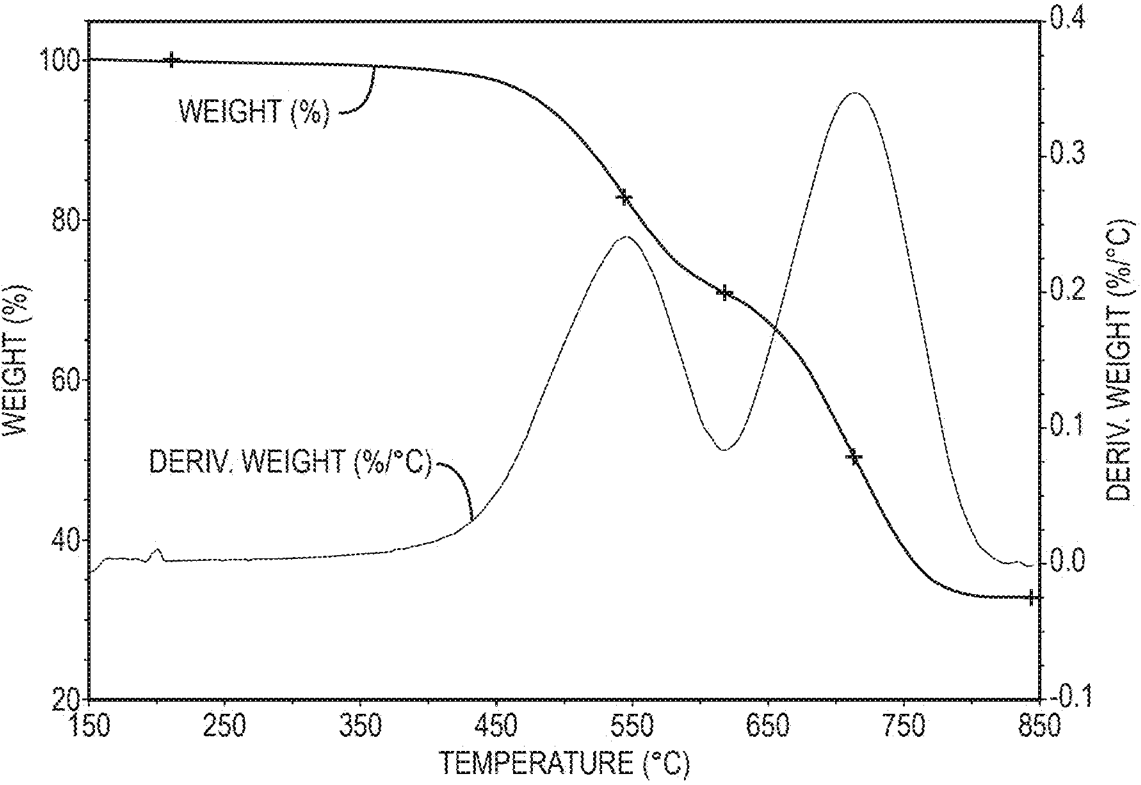

FIGS. 20A and 20B are TGA analyses of CNT/carbon black and CNT/graphite hybrid materials, respectively. In FIG. 20A, two distinguishable signals can be observed, at about 577° C. and at 682° C. that correspond to MWCNT/carbon black, respectively. The estimated MWCNT content in the hybrid material is about 53 wt %. Marked data points from left to right on the weight % curve are at 210.81° C. and 99.87%, 576.62° C. and 66.23%, 624.64° C. and 47.31%, 681.85° C. and 29.83%, and 843.56° C. and 15.48%. In FIG. 20B, the maximum oxidation rate signals corresponding to MWCNT and graphite are situated at about 545° C. and 714° C., respectively. In this case, the estimated MWCNT content in the hybrid material is about 30 wt %. Marked data points from left to right on the weight % curve are at 212.22° C. and 99.95%, 5444.84° C. and 82.99%, 618.29° C. and 70.91%, 713.62° C. and 50.43%, and 844.98° C. and 32.80%.

Figure 21B:
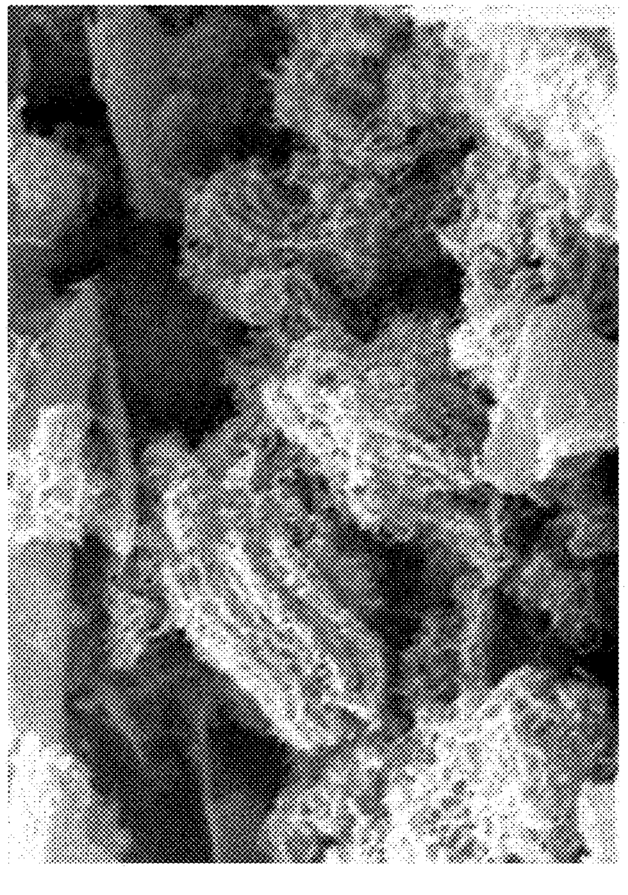
FIGS. 21A and 21B are SEM images of a MWCNT-carbon black hybrid material and a MWCNT-graphite hybrid material, respectively.
Figure 21A:
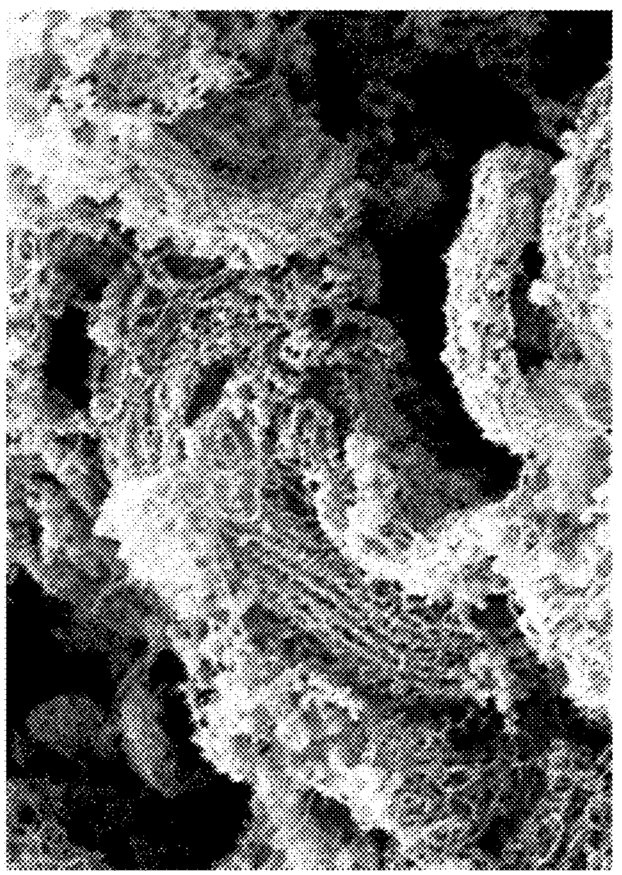

FIGS. 21A and 21B are SEM images corresponding to MWCNT-carbon black and MWCNT-graphite hybrid materials synthesized in a fluidized bed reactor, respectively. SEM images show smaller carbon black aggregates (FIG. 21A) and graphite flake particles (FIG. 21B) separated from each other by a mesh of MWCNTs.

Example 7: Synthesis of CNT-Graphene Nanoplatelets

This example describes a method for producing CNT/graphene nanoplatelets hybrid material. In some examples these materials are produced in fluidized bed reactors. A metal oxide supported catalyst precursor is blended with graphene nanoplatelets having approximately 1-4 microns sizes (graphene nanoplatelets shown in FIG. 22A at 25 KX) in a 30/70 wt % proportion respectively, following the procedure described in the Example 2.

CNT/graphene nanoplatelets hybrid material was synthesized in a fluidized bed reactor at a temperature=675° C., gas composition=75% v $C_2H_4$ in $H_2$, catalyst/gas flow ratio=1.3 g catalyst/l, and a reaction time of 10 minutes.

Figure 22A:
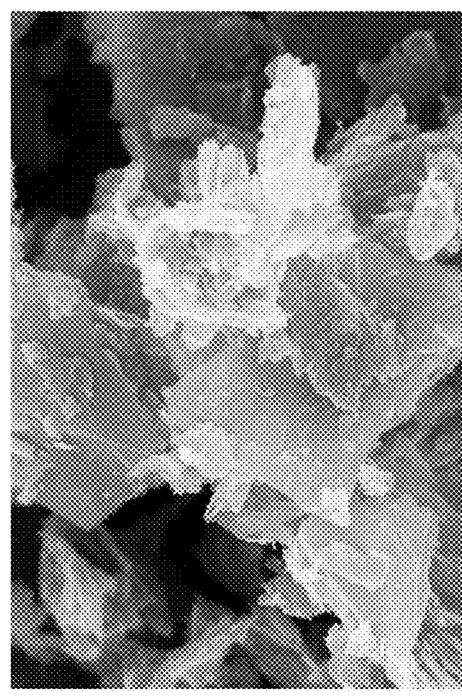
FIG. 22A is an SEM image of graphene nano-platelets.
Figure 22B:
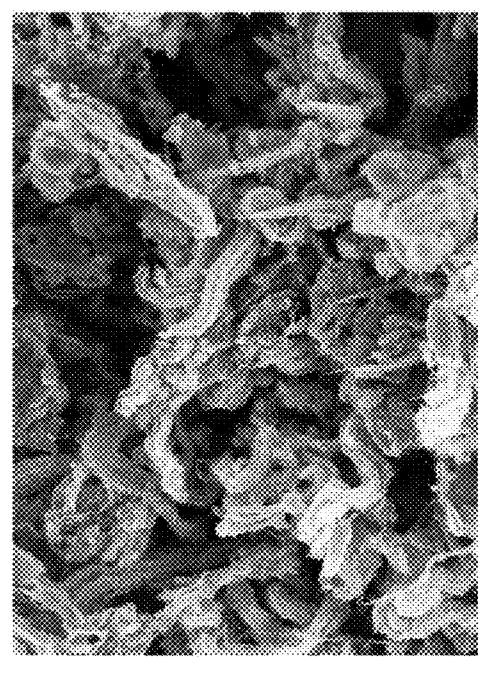
FIGS. 22B and 22C are SEM images taken at low and high magnification, respectively, of a MWCNT-graphene nano-platelet hybrid material.
Figure 22C:
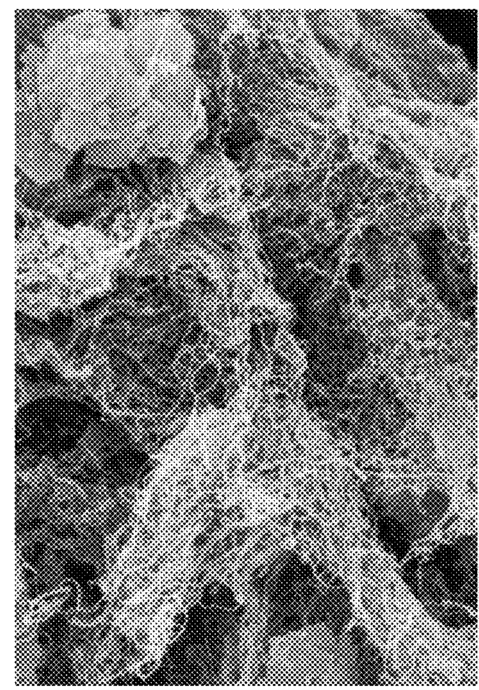

FIG. 22A is an SEM image of graphene nano-platelets. FIGS. 22B and 22C are SEM images taken at low (5 KX) and high (25 KX) magnification, respectively. The formation of a fine mesh of MWCNTs can be observed surrounding the surface of the graphene nanoplatelets.

In Table 3 it is observed that the MWCNT/graphene nano-platelets hybrid material has a significantly higher surface area and pore volume as compared with the graphene nano-platelets material itself.

TABLE 3

Textural properties corresponding to MWCNT/graphene nano-platelets hybrid material

| Sample | BET Surface Area ($m^2/g$) | Pore volume (cc/g) |
|---|---|---|
| graphene nano-platelets | 131 | 0.25 |
| MWCNT/graphene nano-platelets hybrid material | 352 | 1.34 |

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A carbon nanotube (CNT) hybrid powder material, comprising:

a blend of a powder catalyst material and a separate powder carbon material, wherein the powder catalyst material comprises a plurality of metal-oxide supported metal catalyst powder grains that make up at least 15% by weight of the blend, each catalyst grain formed from a number of elementary catalyst particles grouped to form the catalyst grain, and the separate powder carbon material comprises a plurality of agglomerates of carbon black particles, each agglomerate formed from multiple carbon black particles;

a mesh of CNTs grown on and directly coupled to the elementary catalyst particles and proximate to but not directly coupled to the separate carbon black particles;

wherein at least some of the elementary catalyst particles are physically separate from and not part of the catalyst grains;

wherein at least some of the carbon black particles are physically separate from and not part of the agglomerates of carbon black particles;

wherein at least some of the carbon black particles are separate from and not located on either the catalyst particles or the CNTs; and wherein the CNT hybrid powder material comprises at least 13% by weight CNT and has a tap bulk density of less than one third of the tap bulk density of the carbon black.

2. The material of claim 1 wherein the metal oxide of the catalyst material comprises silica.

3. The material of claim 2 wherein the catalyst material further comprises silica nanoparticles on the silica.

4. The material of claim 3 wherein the CNTs are formed on both the silica of the catalyst material and the silica nanoparticles.

5. The material of claim 1 wherein the CNT hybrid powder material comprises at least 40% by weight CNT and has a tap bulk density of less than one fifth of the tap bulk density of the carbon black.

6. The material of claim 1 wherein the CNT comprises at least one of single-walled CNT (SWCNT), few-walled CNT (FWCNT), and multi-walled CNT (MWCNT).

7. The material of claim 1 comprising from about 5 weight percent to about 50 weight percent CNT.

8. The material of claim 1 wherein the metal oxide of the catalyst material comprises metal oxide particles.

9. The material of claim 8 wherein the elementary catalyst particles comprise catalyst on at least some of the metal oxide particles.

10. The material of claim 1 wherein the elementary catalyst particles make up from 10 weight percent to 50 weight percent of the total weight of the elementary catalyst particles plus the particles of the carbon black.

11. The material of claim 8 wherein the metal oxide particles comprise at least one of alumina, silica, and magnesia.

12. The material of claim 1 having a BET surface area of at least about 140 $m^2/g$.

13. The material of claim 1 having a pore volume of at least about 0.43 ml/g.

14. The material of claim 1 having a tap bulk density of about 0.102 g/ml or less.

15. The material of claim 1 having a mean particle size of at least about 42 microns.

* * * * *